United States Patent
Compagnone, Jr.

(10) Patent No.: US 6,686,540 B2
(45) Date of Patent: Feb. 3, 2004

(54) TEMPORARY PROTECTIVE COVER FOR AN ELECTRICAL BOX

(76) Inventor: Carlo Compagnone, Jr., 17 Central Ave., Newtonville, MA (US) 02160

( * ) Notice: Subject to any disclaimer, the term of this patent is extended or adjusted under 35 U.S.C. 154(b) by 0 days.

(21) Appl. No.: 10/170,101

(22) Filed: Jun. 12, 2002

(65) Prior Publication Data

US 2002/0157851 A1 Oct. 31, 2002

Related U.S. Application Data

(63) Continuation-in-part of application No. 09/800,141, filed on Mar. 5, 2001, which is a continuation-in-part of application No. 09/590,130, filed on Jun. 8, 2000, now abandoned.

(51) Int. Cl.[7] .............................................. H01H 9/02
(52) U.S. Cl. ........................... 174/58; 174/66; 174/67; 220/3.8; 220/241
(58) Field of Search ............................ 174/58, 50, 54, 174/53, 63, 66; 33/DIG. 10, 528; 220/3.3, 3.2, 241, 3.8, 242; D13/154, 156

(56) References Cited

U.S. PATENT DOCUMENTS

| | | | |
|---|---|---|---|
| 2,934,590 A | | 4/1960 | Thompson et al. |
| 3,438,534 A | * | 4/1969 | Zerwes ........................ 220/241 |
| 3,620,404 A | * | 11/1971 | Grasso ........................ 174/48 |
| 3,745,664 A | * | 7/1973 | Altseimer .................... 220/3.4 |
| D261,135 S | | 10/1981 | Horne |
| 4,363,014 A | * | 12/1982 | Leach et al. .............. 174/138 F |
| 4,534,486 A | | 8/1985 | Eidson |
| 4,541,538 A | | 9/1985 | Swetnam |
| 4,605,139 A | | 8/1986 | Dacar |
| 4,717,358 A | * | 1/1988 | Chaundy ..................... 174/55 |
| 4,733,330 A | * | 3/1988 | Tanaka et al. ................ 174/58 |
| 4,896,784 A | * | 1/1990 | Heath .......................... 174/53 |
| 4,907,711 A | | 3/1990 | Stuchlik, III |
| 4,979,633 A | | 12/1990 | Lakey |
| 5,077,452 A | * | 12/1991 | Mathers et al. ............... 174/66 |
| 5,186,661 A | * | 2/1993 | Capper ....................... 439/521 |
| 5,223,673 A | | 6/1993 | Mason |
| D345,142 S | * | 3/1994 | Porter ........................ 174/67 |
| 5,301,437 A | | 4/1994 | Burke |
| 5,359,152 A | * | 10/1994 | Hone-Lin ..................... 174/53 |
| 5,491,902 A | * | 2/1996 | Uhrin et al. .................. 33/528 |
| 5,526,952 A | | 6/1996 | Green |
| 5,531,345 A | * | 7/1996 | Nakamura et al. ........... 220/3.8 |
| 5,562,222 A | | 10/1996 | Jordan et al. |
| 5,574,256 A | | 11/1996 | Cottone |
| 5,639,991 A | | 6/1997 | Schuette |
| 5,703,329 A | * | 12/1997 | Delone ........................ 174/67 |
| 5,710,392 A | | 1/1998 | Bordwell et al. |
| 5,744,750 A | * | 4/1998 | Almond ....................... 174/49 |
| 5,763,831 A | * | 6/1998 | Shotey et al. ................ 174/67 |
| 5,834,692 A | * | 11/1998 | Lentz .......................... 174/57 |
| 5,863,016 A | * | 1/1999 | Makwinski et al. .......... 174/48 |
| 5,936,199 A | | 8/1999 | Lutz |
| 5,942,729 A | * | 8/1999 | Carlson, Jr. et al. .......... 174/66 |
| 6,076,696 A | | 6/2000 | Neuman |
| 6,098,798 A | * | 8/2000 | Abbott et al. ............... 206/216 |
| 6,103,974 A | | 8/2000 | Erdfarb |
| 6,111,760 A | * | 8/2000 | Nixon ........................ 220/4.02 |
| 6,127,630 A | | 10/2000 | McKenzie et al. |
| 6,369,322 B1 | * | 4/2002 | Gretz .......................... 174/50 |
| 6,390,320 B2 | * | 5/2002 | Hurst et al. ................. 220/241 |
| 6,433,280 B2 | * | 8/2002 | Winterer et al. .............. 174/66 |
| 6,462,278 B1 | * | 10/2002 | Vrame ......................... 174/67 |
| 6,479,749 B1 | * | 11/2002 | Vrame ......................... 174/67 |

* cited by examiner

Primary Examiner—Dean A. Reichard
Assistant Examiner—Angel R. Estrada
(74) Attorney, Agent, or Firm—Kreigsman & Kreigsman

(57) ABSTRACT

A temporary protective cover for an electrical box having an open front end includes in one embodiment a plate shaped to enclose the open front end and a pair of wings formed onto the plate for securing the cover onto the electrical box. A line of weakness extends across the rear surface of the plate from the right side edge to the left side edge. A plurality of posts are formed onto the rear surface of the plate and serve to limit movement of the cover when mounted onto the electrical box. The pair of wings are spaced adequately in from the left and right side edges of the plate and extend rearwardly from the rear surface of the plate at an angle away from one another. Each wing is shaped to include a flexible leg and an enlarged foot, the foot including a tapered guiding surface and a substantially flat engagement surface.

5 Claims, 21 Drawing Sheets

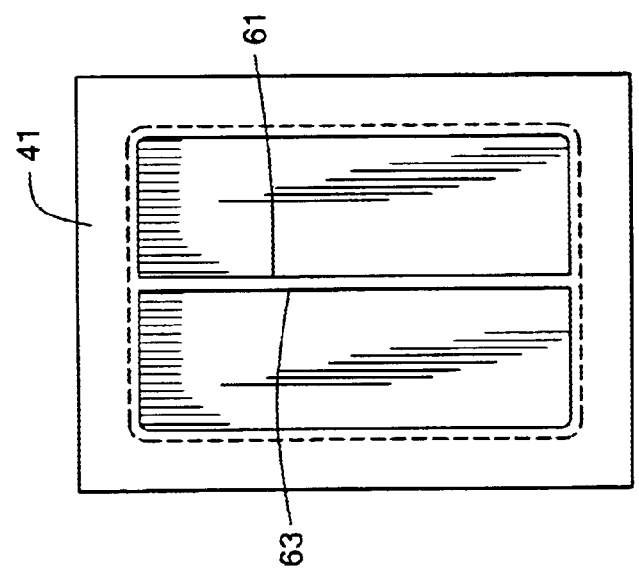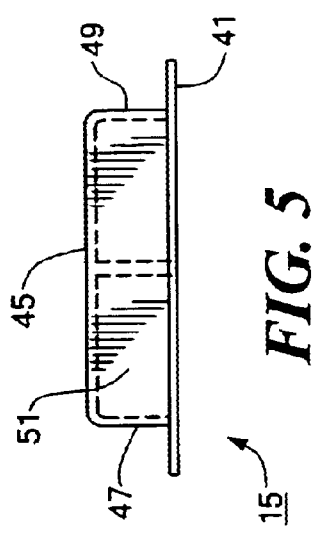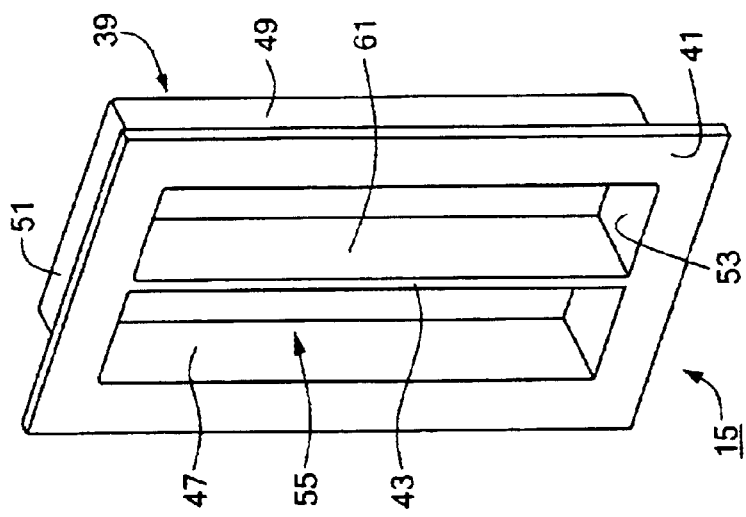

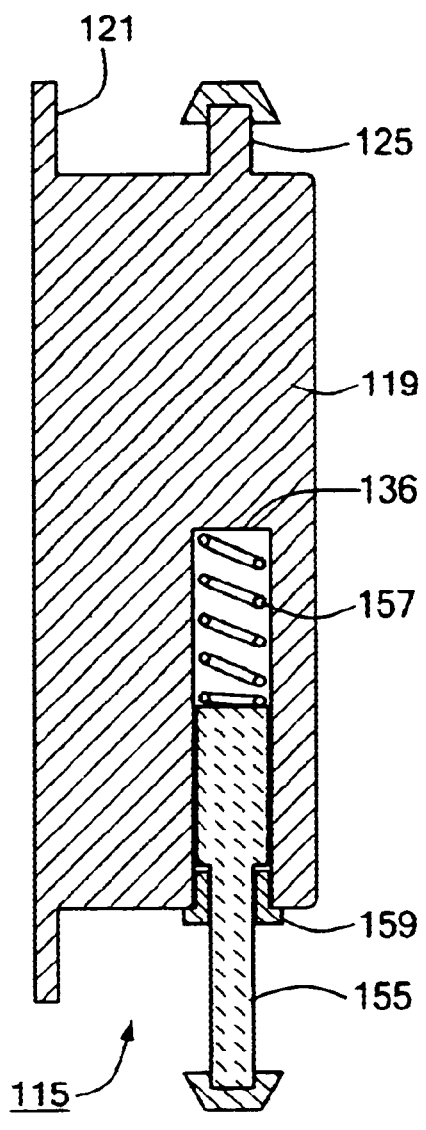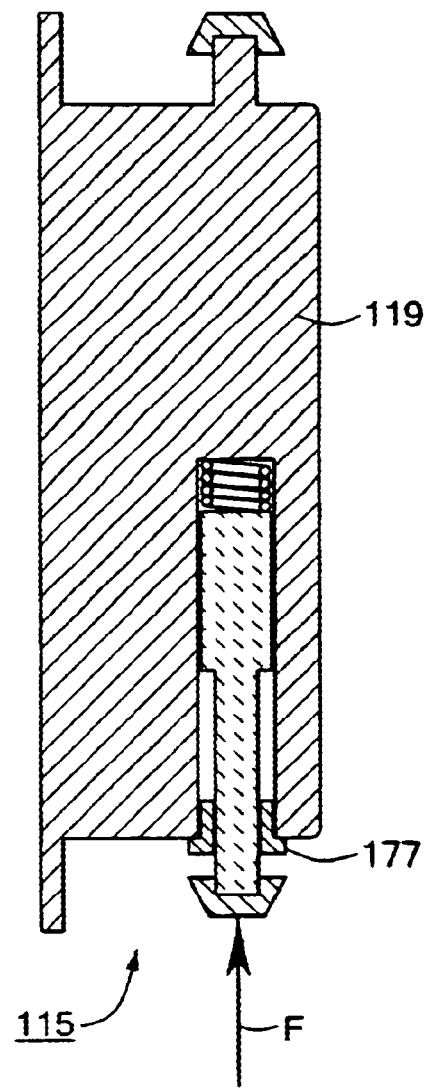
*FIG. 21*  *FIG. 22*

TEMPORARY PROTECTIVE COVER FOR AN ELECTRICAL BOX

CROSS-REFERENCE TO RELATED APPLICATIONS

This application is a continuation-in-part of U.S. patent application Ser. No. 09/800,141, which was filed on Mar. 5, 2001 in the name of Carlo Compagnone, Jr. and which, in turn, is a continuation-in-part of U.S. patent application Ser. No. 09/590,130, which was filed on Jun. 8, 2000 in the name of Carlo Compagnone, Jr.

BACKGROUND OF THE INVENTION

The present invention relates generally to electrical wiring and, more particularly, to electrical boxes for electrical wiring.

Electrical boxes are well known in the art and are commonly used to perform two principal functions. First, an electrical box commonly serves as a mounting structure for installing an electrical device, such as an outlet, switch or fixture, into a covering, such as a wall or ceiling panel. Second, an electrical box commonly serves as a connection point for coupling the electrical device to electrical wires which, in turn, are connected to a main power source.

Electrical boxes are commonly manufactured in various shapes and sizes. The particular size and shape of an electrical box is based largely upon the particular application in which the box is to be used. Specifically, different types of electrical boxes are constructed according to the location in which the electrical box is to be installed. For example, a wall box is one well known type of electrical box which is commonly used as a mounting structure for installing an electrical device, such as an outlet or switch, into a wall and as a connection point for electrically coupling the device to a main power source. As another example, a ceiling box is another well known type of electrical box which is commonly used as a mounting structure for installing an electrical device, such as a light or fan, into a ceiling and as a connection point for electrically coupling the device to a main power source.

Electrical boxes are also commonly manufactured out of different materials. As a first example, electrical boxes are commonly constructed of metal. Metal electrical boxes are desirable in that they are considerably durable and sturdy in construction. However, metal electrical boxes are undesirable in that they require proper grounding in order to avoid dangerous electrical conditions. As a second example, electrical boxes are also commonly constructed of a nonmetallic material, such as plastic. Nonmetallic electrical boxes are desirable in that they are considerably inexpensive to manufacture and do not require electrical grounding.

Electrical boxes are further constructed to include different mounting devices based upon the stage in construction when the electrical box is installed. For example, an old-work, or cut-in, electrical box is one well known type electrical box which is designed to be mounted into a hole in a covering, such as a wall or ceiling panel, which is already mounted onto one or more support beams. As another example, a new-work electrical box is another well known type of electrical box which is designed to be installed directly on a support beam before the covering is mounted onto the support beams.

Electrical boxes are typically shaped to include a back panel and one or more side panels which project out perpendicularly out from the back panel. The back panel and the one or more side panels together define an interior cavity into which electrical wiring is disposed. Each of the one or more side panels includes a free front edge, the free front edges of the one or more side panels together defining an open front end which provides access into the interior cavity of the electrical box. The particular volume of the interior cavity of the box is typically designed based upon the number of wires entering the box and the type and number of devices attached onto the box. Electrical boxes also commonly include one or more outwardly projecting tabs which facilitate mounting the box onto a structure. Specifically, each outwardly projecting tab is adapted to receive a securing device, such as a nail or screw, which, in turn, can be disposed into a structure, such as a support beam or wall panel, so as to fixedly mount the box onto the structure.

In use, a nonmetallic, new-work wall box can be used to install an electrical receptacle, or outlet, into a wall in the following manner. During the preliminary stages of constructing a building, support beams, typically in the form of wooden two-by-fours, are typically erected in order to define the general room configurations of the building. With the support beams erected, a nail disposed through each tab of the wall box is driven into a support beam, thereby fixedly mounting the wall box onto an associated support beam at a desired location within a room of the building.

With the wall box mounted onto the support beam as such, electrical wiring which is coupled to the main electrical power source is run amongst the support beams and into the various rooms of the building. Particular wires of the electrical wiring are fed through the wall box and into its interior cavity in order to provide electrical power to the outlet which is subsequently installed in the wall box. Specifically, selected wires which are coupled to the main electrical power source are passed through openings which are provided in the back panel or in one or more of the side panels, the openings commonly being created by removing breakaway tabs which are pre-formed in the box.

Having mounted the wall box onto an associated support beam and having fed selected electrical wires into the interior cavity of the wall box as noted above, various sections of wall paneling, such as blue board, are then mounted onto the support beams to enclose the various rooms of the building. It should be noted that the sections of wall paneling are typically mounted onto the support beams directly over the wall box. In fact, the sections of wall paneling typically are mounted onto the support beams so as to abut directly against the open front end of the box. Because the wall paneling abuts against the open front end of the wall box, the section of wall paneling which is disposed directly over the wall box is often slightly raised or bubbled.

As can be appreciated, with the wall panels mounted onto the support beams directly over the wall box, an electrician is unable to access the interior cavity of the wall box and, as a result, is unable to install the electrical outlets into the wall. Accordingly, a worker is required to create an opening in the wall panels at the location of the wall box in order to provide a means of accessing the interior cavity of the wall box. Conventionally, a router is used to pierce through the wall panels and cut out the wall box.

Once the wall panels have been cut so as to expose the interior recess of the wall box, a worker plasters the wall panels. After the wall panels have been plastered, another worker paints the wall panels, thereby completing construction of the wall of the room. With construction of the wall having been completed, an electrician connects one or more electrical outlets to the wires which are disposed within the interior cavity of the wall box in order to electrically connect the outlets to the main power source. After electrically connecting the outlets to the main power source, the outlets are disposed within the interior recess of the wall box and are fixedly retained in place by disposing one or more screws through openings formed in the electrical outlets and into engagement with a threaded bore formed in the wall box. A plastic cover plate is then commonly disposed over the outlets and is fixedly secured in place by one or more screws.

Although well known and widely used in commerce, electrical boxes of the type described above often suffer from some notable drawbacks.

As a first example, it has been found that disposing electrical wires within an electrical box having an open front end leaves the wires exposed during subsequent stages of construction, which is highly undesirable. Specifically, when an operator uses a router to cut an opening in the panels in order to access the interior cavity of a new-work box, the router, on occasion, will contact the wires disposed within the box. As a consequence, it has been found that establishing contact between the router and the wires can significantly damage the wires and/or create a potentially dangerous condition, which is highly undesirable.

As a second example, it has been found that, when a plasterer plasters over the wall panels or when a router cuts out a new-work wall box, significant amounts of debris can often accumulate within the interior cavity of the wall box. As a result, an electrician is forced to clean out the debris which has collected within the wall box before installing the electrical device, thereby rendering the work of the electrician more labor intensive, which is highly undesirable.

Accordingly, temporary removable covers for enclosing electrical boxes are well known in the art.

As an example, in U.S. Pat. No. 6,103,974 to J. Erdfarb there is disclosed a paint cover including a plate having a front and rear surface. The front surface having a top, bottom and side portion. The top, bottom and side continuous outer edges which project rearward from the front surface, wherein the outer edge is curved and tapered. The rear surface having a top, bottom and side portions and a flexible arm extending rearwardly from each of the side portions of the rear surface, wherein the arms upon insertion into an outlet assembly frictionally engage the inside of the assembly so as to extend a force to secure the paint cover to an outlet box.

As another example, in U.S. Pat. No. 5,526,952 to R. L. Green there is disclosed a temporary protective cover for electrical outlet boxes and the like which prevents the boxes from being covered with wall material during installation, prevents paint and plaster from entering the boxes during finishing operations, and also prevents electrical shock from contact with exposed wires. The cover is molded in one piece and is constructed of polymeric material. The cover is universally dimensioned to cover the box openings of all conventionally sized boxes and includes a base member for encasing electrical elements positioned in and extending outwardly from the boxes. A plurality of retaining members frictionally secure the cover over the box openings. A plurality of projections extend from the cover to indicate the location of the box openings, to mark the periphery thereof on drywall for subsequent cutting, and to prevent wire damage during cutting. A plurality of holes are also provided in the cover for receiving fasteners to provide further securement of the cover over the openings.

As another example, in U.S. Pat. No. 5,562,222 to R. L. Jordan, there is disclosed a temporary cover for electrical outlet boxes which seals such boxes during the finishing stages of building construction, for plastering and wallboard work on interior walls and the like. The cover comprises a very thin sheet of continuous, unbroken material having an inwardly extending flange which is sized to frictionally engage the inner surfaces of the walls of the outlet box. The cover is pressed into place in the box opening, and plastering or wallboard joint compound work may be performed without possibility of contaminating the electrical box with plaster, wallboard joint compound, or similar materials, and/or possibly completely filling the box with the subsequent problems of locating the concealed box and/or accessing wiring or other components therein which have been covered by plaster or other material. The cover may be removed easily by an inwardly protruding grip, and may be economically discarded after a single use due to its construction of thin vacuum formed plastic or the like. Advertising or other messages may be applied to the surface of the opaque, translucent or transparent cover, and the cover may be made of transparent materials in order that persons may view any wiring or components within the electrical box.

As another example, in U.S. Pat. No. 4,907,711 to C. F. Stuchlik, III., there is disclosed a protective cover for electrical outlet boxes and the like which prevents the outlet box from being covered during installation of drywall and prevents entry of debris into the outlet box while permitting the interior of the outlet box to be readily accessible. The cover is provided with projections extending from the cover for indicating the location of the outlet box in the drywall, prior to being covered by the drywall while also providing a manner in which to mark reference points on the drywall for subsequent cutting. The cover can be of a reusable form or can be integrally molded with the outlet box.

Although well known in the art, covers of the type described above often suffer from a notable drawback. Specifically, it has been found that covers of the type described above are often insufficiently retained onto electrical outlet boxes. As a result, such covers are susceptible of being inadvertently removed from the electrical box outlet during use, which is highly undesirable.

SUMMARY OF THE INVENTION

It is an object of the present invention to provide a new and improved cover for an electrical box.

It is another object of the present invention to provide a cover as described above which can removably mounted onto an electrical box which, in turn, can be used as a mounting structure for installing an electrical device, such as an outlet, switch or fixture, into a covering, such as a wall or ceiling panel.

It is yet another object of the present invention to provide a cover as described above which can be removably mounted onto an electrical box which, in turn, can be used as a connection point for coupling the electrical device to electrical wiring which, in turn, is coupled to a main power source.

It is still another object of the present invention to provide a cover as described above which can be removably mounted onto an electrical box which, in turn, is sized and shaped to include an interior cavity into which the electrical wiring is disposed.

It is yet still another object of the present invention to provide a cover as described above which is sized and shaped to protect the electrical wiring which is disposed within the interior cavity of the electrical box.

It is another object of the present invention to provide a cover as described above which is sized and shaped to prevent debris from collecting within the interior cavity of the electrical box.

It is yet another object of the present invention to provide a cover as described above which can be sufficiently retained onto the electrical box.

Accordingly, in one embodiment of the present invention, there is provided a temporary protective cover for an electrical box, said electrical box including an interior cavity and an open front end in communication with the interior cavity, said cover comprising a plate sized and shaped to enclose the open front end of said electrical box, and a pair of wings formed onto said plate, said pair of wings being adapted to secure said cover onto said electrical box, wherein each wing comprises a leg and a foot, said leg comprising a first end formed onto said plate and a second end, said foot being formed onto the second end of said leg.

In another embodiment of the present invention, there is provided a temporary protective cover for an electrical box, said electrical box including an interior cavity and an open front end in communication with the interior cavity, said cover comprising a plate sized and shaped to enclose the open front end of said electrical box, said plate including a front surface, a rear surface, a top edge, a bottom edge, a right side edge and a left side edge, and a pair of wings which extend rearwardly from the rear surface of said plate, said pair of wings being adapted to secure said cover onto said electrical box, wherein said first wing is spaced in from the left side edge of said plate and said second wing is spaced in from the right side edge of said plate.

In another embodiment of the present invention, there is provided a temporary protective cover for an electrical box, said electrical box including an interior cavity and an open front end in communication with the interior cavity, said cover comprising a plate sized and shaped to enclose the open front end of said electrical box, said plate including a front surface, a rear surface, a top edge, a bottom edge, a right side edge and a left side edge, a pair of wings which extend rearwardly from the rear surface of said plate, said pair of wings being adapted to secure said cover onto said electrical box, and at least one post formed onto the rear surface of said plate.

In another embodiment of the present invention, there is provided a temporary protective cover for an electrical box, said electrical box including an interior cavity and an open front end in communication with the interior cavity, said cover comprising a plate sized and shaped to enclose the open front end of said electrical box, said plate being shaped to include a line of weakness, and a pair of wings which extend rearwardly from the rear surface of said plate, said pair of wings being adapted to secure said cover onto said electrical box.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration particular embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate particular embodiments of the invention and, together with the description, serve to explain the principles of the invention. In the drawings wherein like reference numerals represent like parts:

FIG. 3 is a front perspective view of the cover shown in FIG. 1;

FIG. 4 is a front plan view of the cover shown in FIG. 3;

FIG. 5 is a top plan view of the cover shown in FIG. 3;

FIG. 6 is a right side plan view of the cover shown in FIG. 3;

FIG. 21 is a right side section view of the cover assembly shown in FIG. 14, taken along lines 21—21;

FIG. 22 is a right side section view of the cover assembly shown in FIG. 14, taken along lines 21—21, the cover assembly being shown with an inward force applied onto the inward mounting post;

DETAILED DESCRIPTION OF A PREFERRED EMBODIMENT

Figure 1:
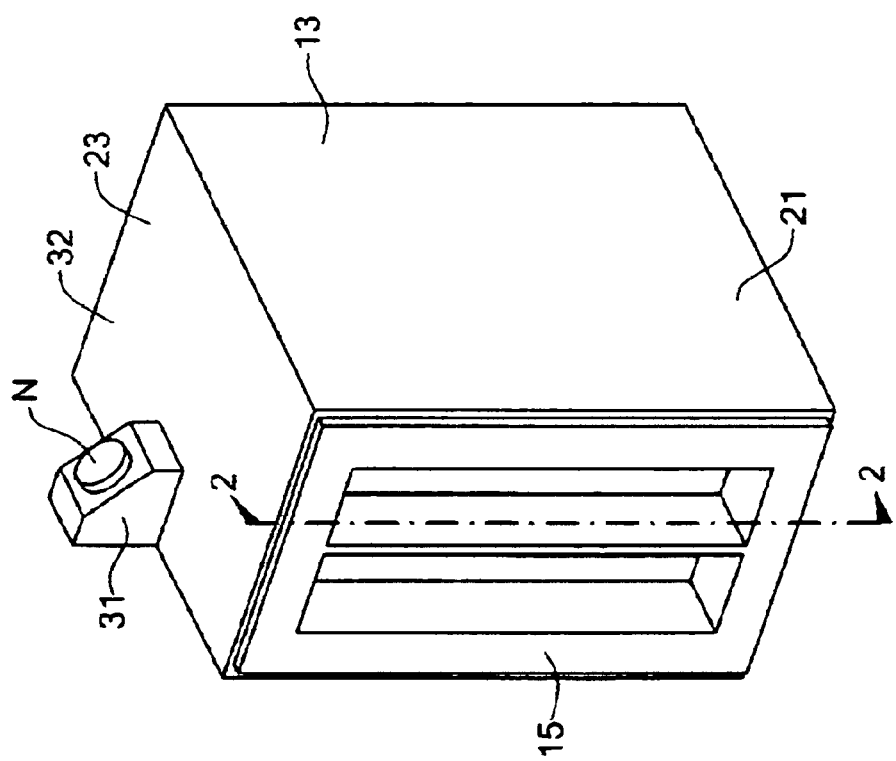
FIG. 1 is a front perspective view of a first embodiment of a cover for an electrical box constructed according to the teachings of the present invention, the cover being shown mounted onto an electrical box.

Referring now to FIG. 1, there is shown a first embodiment of a cover which is adapted to be removably mounted onto an electrical box, said cover being constructed according to the teachings of the present invention. For purposes of identification, the electrical box is represented generally by reference numeral 13 and the cover is represented generally by reference numeral 15.

As will be described further in detail below, electrical box 13 serves two principal functions. First, electrical box 13 serves as a mounting structure for installing an electrical device, such as an outlet, switch or fixture, into a covering, such as a wall or ceiling panel. Second, electrical box 13 serves as a connection point for coupling the electrical device to electrical wires which, in turn, are connected to a main power source.

Electrical box 13 is a conventional new-work, electrical wall box which is constructed out of a nonmetallic material, such as plastic. Electrical box 13 is represented herein as a single gang electrical box (i.e., an electrical box which is sized and shaped to receive a single electrical outlet). However, it is to be understood that cover 15 is not limited for use with single gang electrical boxes. Rather, cover 15 could be modified in size and shape to be used in conjunction with alternative types of electrical boxes, as will be described further in detail below.

Electrical box 13 is an integral unit and comprises a rectangular back panel 17, a left side panel 19 having a free front edge 20, a right side panel 21 having a free front edge 22, a top panel 23 having a free front edge 24 and a bottom panel 25 having a free front edge 26. Panels 19, 21, 23 and 25 extend orthogonally out from back panel 17 so as to define a box-shaped interior cavity 27 therebetween. Free edges 20, 22, 24 and 26 together define an open front end 29 in communication with interior cavity 27, open front end 29 providing access to interior cavity 27 of box 13.

Electrical box 13 also comprises a tab 31 which is integrally formed onto exterior surface 32 of top panel 23. Tab 31 is shaped to include opening (not shown) through which a nail N can be disposed in order to mount electrical box 13 on a support member, as will be described further in detail below. It should be noted that electrical box 13 is not limited to a single tab 31. Rather, electrical box 13 could alternatively include a plurality of tabs 31 formed thereon for securing electrical box 13 onto a support member without departing from the spirit of the present invention. It should also be noted that electrical box 13 is not limited to tab 31 being formed onto top panel 23. Rather, electrical box 13 could be alternatively constructed so that tab 31 is formed onto a different panel of box 13, such as back panel 17, left side panel 19, right side panel 21 or bottom panel 25, without departing from the spirit of the present invention.

Electrical box 13 further comprises a plurality of openings 33 which are formed in back panel 17. Preferably, openings 33 are formed in back panel 17 through the use of breakaway tabs (not shown) and are sized and shaped to enable selected electrical wiring to be disposed through electrical box 13 and into interior cavity 27. It should be noted that electrical box 13 is not limited to openings 33 being formed in back panel 17. Rather, electrical box 13 could be alternatively constructed so that openings 33 are formed onto a different panel of box 13, such as left side panel 19, right side panel 21, top panel 23 or bottom panel 25, without departing from the spirit of the present invention.

Electrical box 13 additionally comprises a first elongated projection 35 which is integrally formed onto top panel 23 and a second elongated projection 37 which is integrally formed onto bottom panel 25. First elongated projection 35 is generally tubular in shape and includes an elongated threaded bore 36. Similarly, second elongated projection 37 is generally tubular in shape and includes an elongated threaded bore 38. As will be described further in detail below, bores 36 and 38 are used to mount an electrical outlet onto electrical box 13.

It should be noted that the particular construction of electrical box 13 does not serve as a feature of the present invention. Accordingly, electrical box 13 could be replaced with alternative types of electrical boxes which are well known in the art without departing from the spirit of the present invention.

For example, electrical box 13 is shown as being constructed of a nonmetallic material. However, it is to be understood that electrical box 13 is not limited to being constructed of a nonmetallic material. Rather, electrical box could be constructed of alternative materials, such as metal, without departing from the spirit of the present invention.

As another example, electrical box 13 is represented as a wall box. However, it is to be understood that electrical box 13 is not limited to a wall box. Rather, electrical box 13 could represent alternative types of electrical boxes which are disposed in different structures, such as ceiling boxes, without departing from the spirit of the present invention.

As another example, electrical box 13 is represented as a new-work box. However, it is to be understood that electrical box 13 is not limited to a new-work box. Rather, electrical box 13 could represent alternative types of electrical boxes which are utilized at different stages of construction, such as old-work boxes, without departing from the spirit of the present invention.

As another example, electrical box 13 is represented as an integral electrical box. However, it is to be understood that electrical box 13 is not limited to being a one-piece electrical box. Rather, electrical box 13 could alternatively be constructed of multiple pieces without departing from the spirit of the present invention.

As noted above, the particular construction of electrical box 13 does not serve as a feature of the present invention. Rather, it should be noted that the novelty of the present invention relates to the construction of cover 15 and to the use of cover 15 to enclose open front end 29 of electrical box 13, as will be described further in detail below.

Specifically, cover 15 is sized and shaped to be removably mounted on electrical box 13 over open front end 29 so as to enclose interior cavity 27. In this manner, cover 15 serves to protect electrical wiring which is disposed within interior cavity 27 and to prevent debris from collecting within interior cavity, which is highly desirable.

Cover 15 is preferably constructed of a durable and inexpensive material, such as plastic, and comprises a tray 39, a flange 41 and a handle 43 which are integrally formed together to make cover 15 a single piece, as shown in FIGS. 3–6. It should be noted that cover 15 is not limited to having a one-piece construction. Rather, cover 15 could alternatively be constructed of multiple pieces without departing from the spirit of the present invention.

Tray 39 comprises an end wall 45 and a plurality of sidewalls 47, 49, 51 and 53 which extend orthogonally out from end wall 45 so as to define a box-shaped recess 55 therebetween. It should be noted that, with cover 15 mounted on electrical box 13, tray 39 is sized and shaped to press-fit within interior cavity 27. Specifically, tray 39 is sized and shaped to fit snugly within interior cavity 27, with sidewall 47 frictionally abutting against left side panel 19, sidewall 49 frictionally abutting against right side panel 21, sidewall 51 frictionally abutting against elongated, tubular projection 35 and sidewall 53 frictionally abutting against elongated tubular projection 37.

Figure 2:
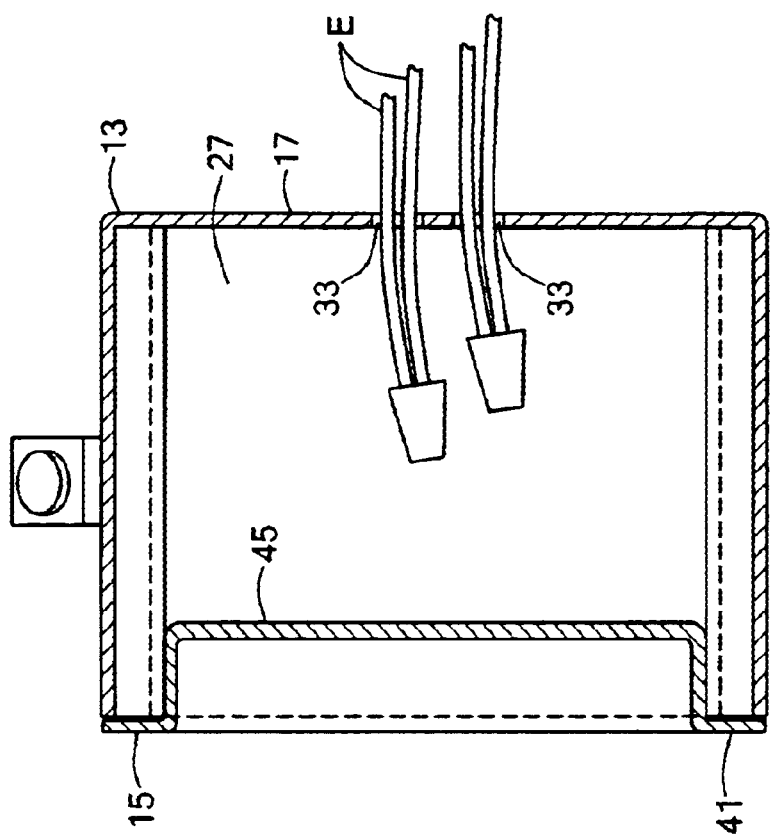
FIG. 2 is a side section view of the cover and the electrical box shown in FIG. 1, taken along lines 2—2, the electrical box being shown with electrical wires disposed into its interior cavity.

Flange 41 is orthogonally formed onto sidewalls 47, 49, 51 and 53 and comprises a generally flat top surface 57 and a generally flat bottom surface 59. It should be noted that, with cover 15 mounted on electrical box 13, flange 41 is sized and shaped so that bottom surface 59 abuts against electrical box 13 at open front end 29 so as to prevent cover 15 from being disposed entirely within interior cavity 27, as shown in FIG. 2.

Handle 43 is disposed within recess 55 of tray 35 and comprises a pair of finger gripping surfaces 61 and 63. It should be noted that an operator utilizes handle 43 for mounting cover 15 onto electrical box 13 and, similarly, for removing cover 15 from electrical box 13, as will be described further in detail below.

Handle 43 is shown as being generally in the shape of a thin rectangular panel. However, it is to be understood that handle 43 could be formed into alternative shapes, such as a C-shaped or U-shaped handle, without departing from the spirit of the present invention.

Handle 43 is also shown as being formed onto end wall 45, extending between sidewall 51 and sidewall 53 and lying flush with top surface 57 of flange 41. However, it is to be understood that handle 43 could be alternatively disposed, such as being formed entirely onto end wall 45, without departing from the spirit of the present invention.

Figure 7:
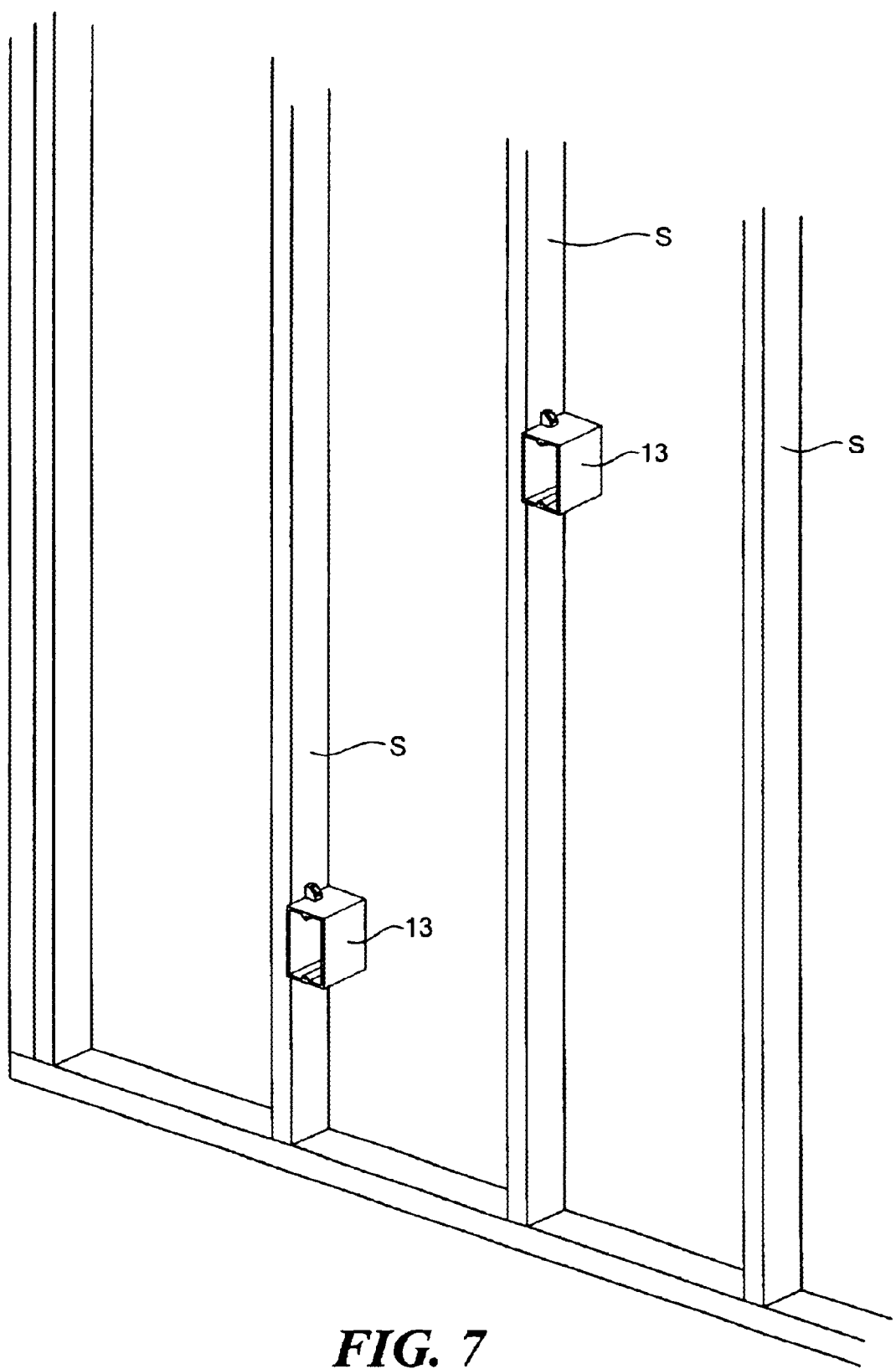
FIG. 7 is a front perspective view of a pair of the electrical boxes shown in FIG. 1, each electrical box being shown mounted on an associated support beam.

In use, electrical box assembly 11 can be used as a mounting structure for installing an electrical outlet O into a wall panel W and as a connection point for coupling electrical outlet O to electrical wires E which, in turn, are connected to a main power source in the following manner. Specifically, during the preliminary stages of constructing a building, support beams S, typically in the form of wooden two-by-fours, are erected in order to define the general room configurations of the building, as shown in FIG. 7.

Figure 8:
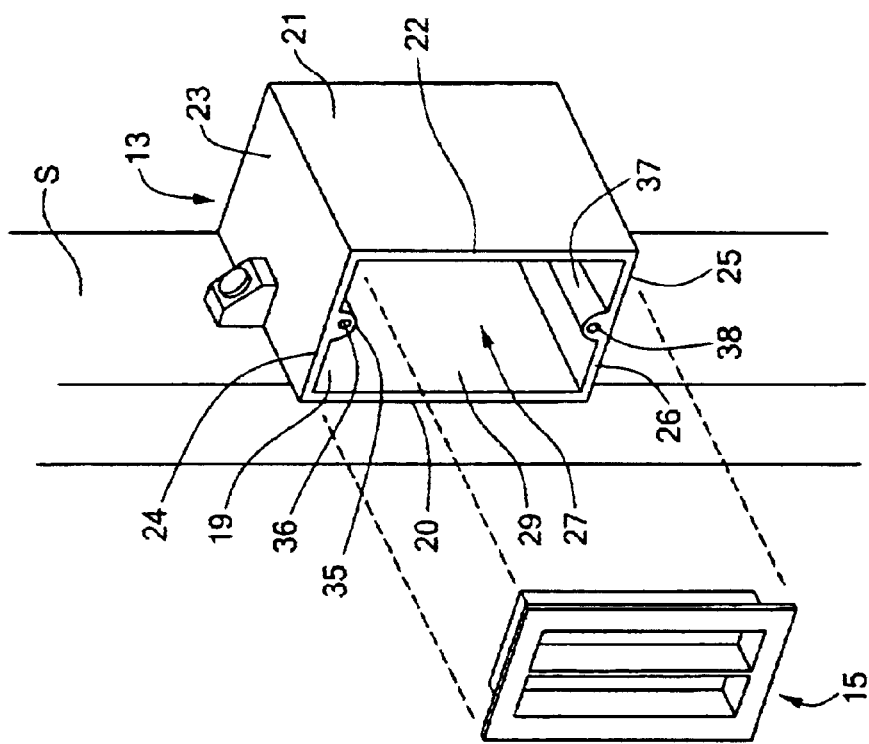
FIG. 8 is a perspective, exploded view of the cover and the electrical box shown in FIG. 1, the electrical box being shown mounted on an associated support beam.

Electrical box 13 is then mounted onto a support beam S in a location which optimizes the accessibility of electrical outlet O within the room. Specifically, a nail N is disposed through tab 31 and is driven into support beam S so as to fixedly mount electrical box 13 onto beam S, as shown in FIG. 8. Electrical wires E, which are connected to a main power source, are run amongst the support beams S and are disposed through openings 33 so as to project into interior cavity 27.

Figure 9:
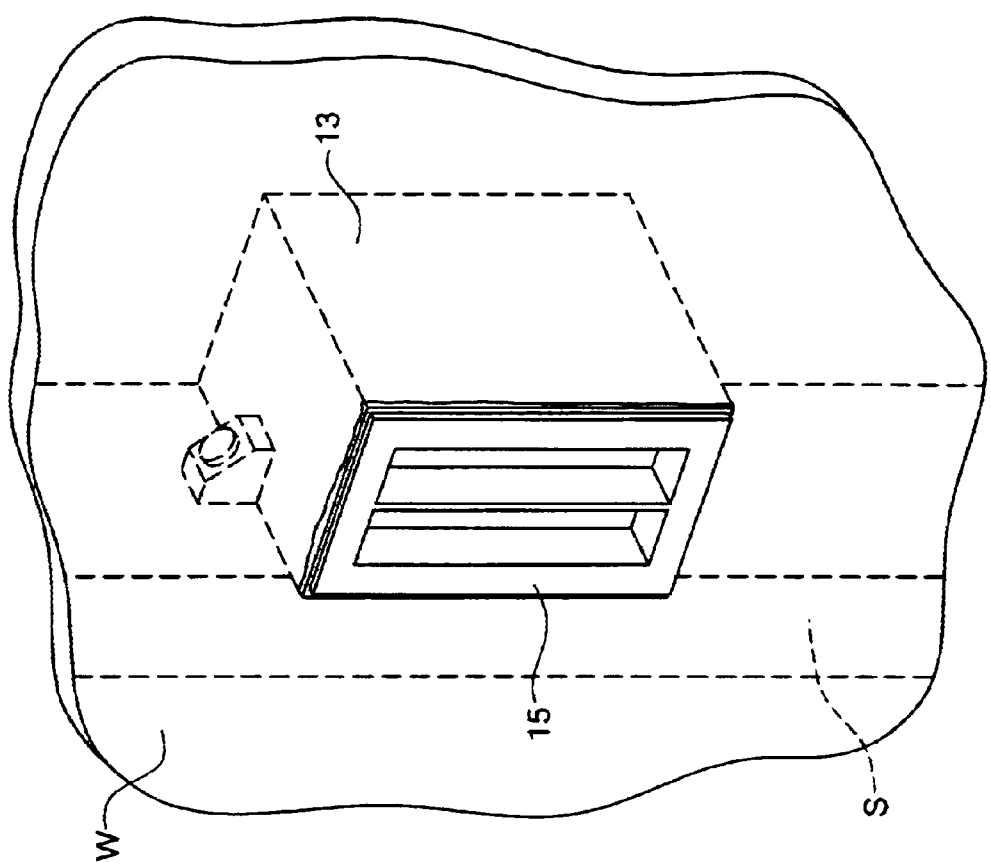
FIG. 9 is a perspective view of the cover and the electrical box shown in FIG. 1, the electrical box being shown mounted on an associated support beam, paneling being shown mounted over the paneling and the electrical box, the portion of the paneling covering the cover being cut out.

Cover 15 is then securely mounted onto electrical box 13. Once completed, wall panel W is mounted onto support beams S over electrical box 13 and cover 15. In order to access electrical box 13, a router is used to cut wall panel W around cover 15, as shown in FIG. 9. Wall panel W is then plastered and painted for aesthetic purposes, thereby completing construction of the walls of the room. As can be appreciated, with cover 15 securely mounted onto electrical box 13, cover 15 serves to protect electrical wires E from being damaged by the router when cutting wall panel W, which is an object of the present invention. In addition, with cover 15 securely mounted onto electrical box 13, cover 15 serves to prevent debris from collecting within interior cavity 27 of electrical box 13, which is another object of the present invention.

Figure 10:
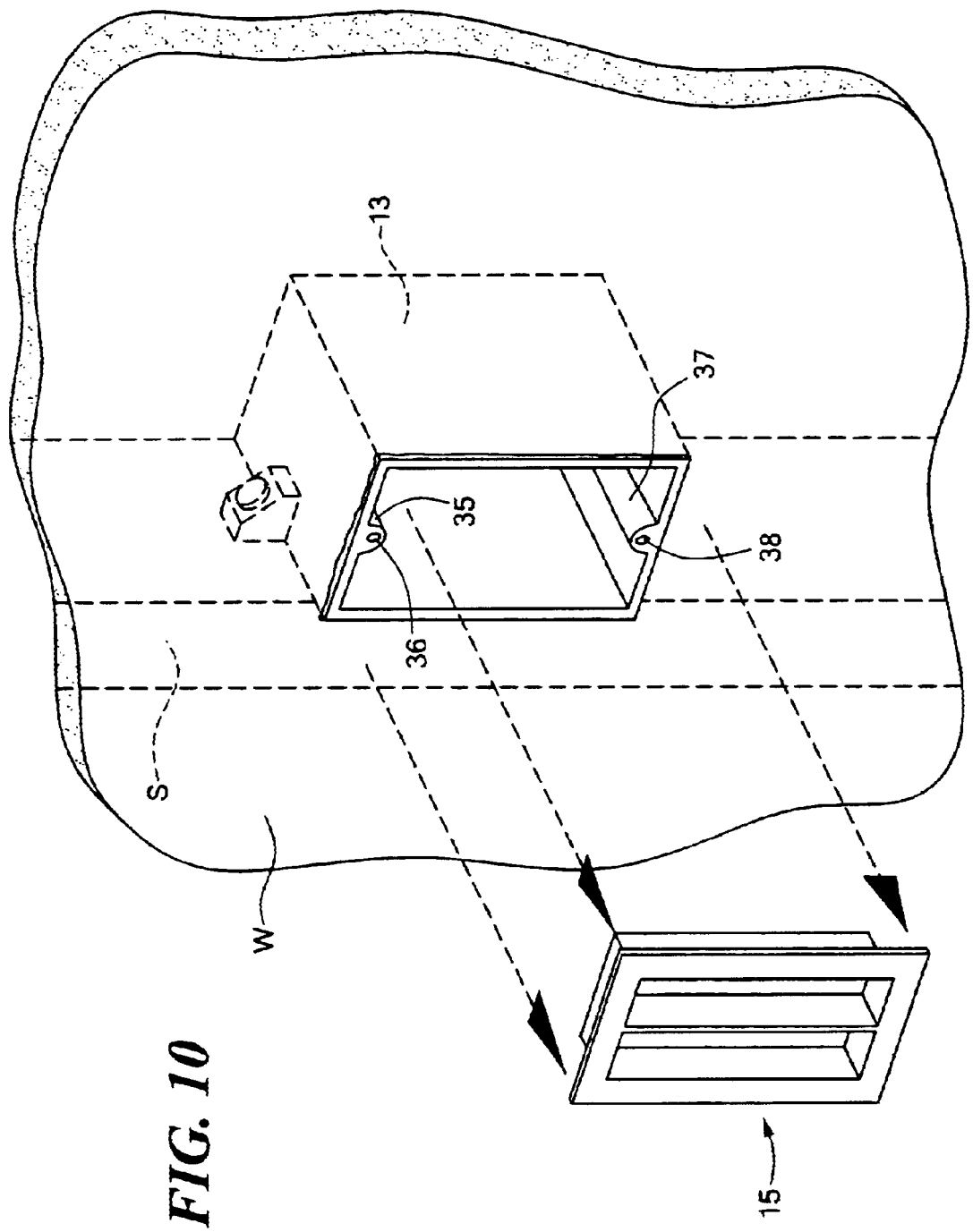
FIG. 10 is an exploded, perspective view of the cover, electrical box and paneling shown in FIG. 9, the cover being shown removed from the electrical box.
Figure 11:
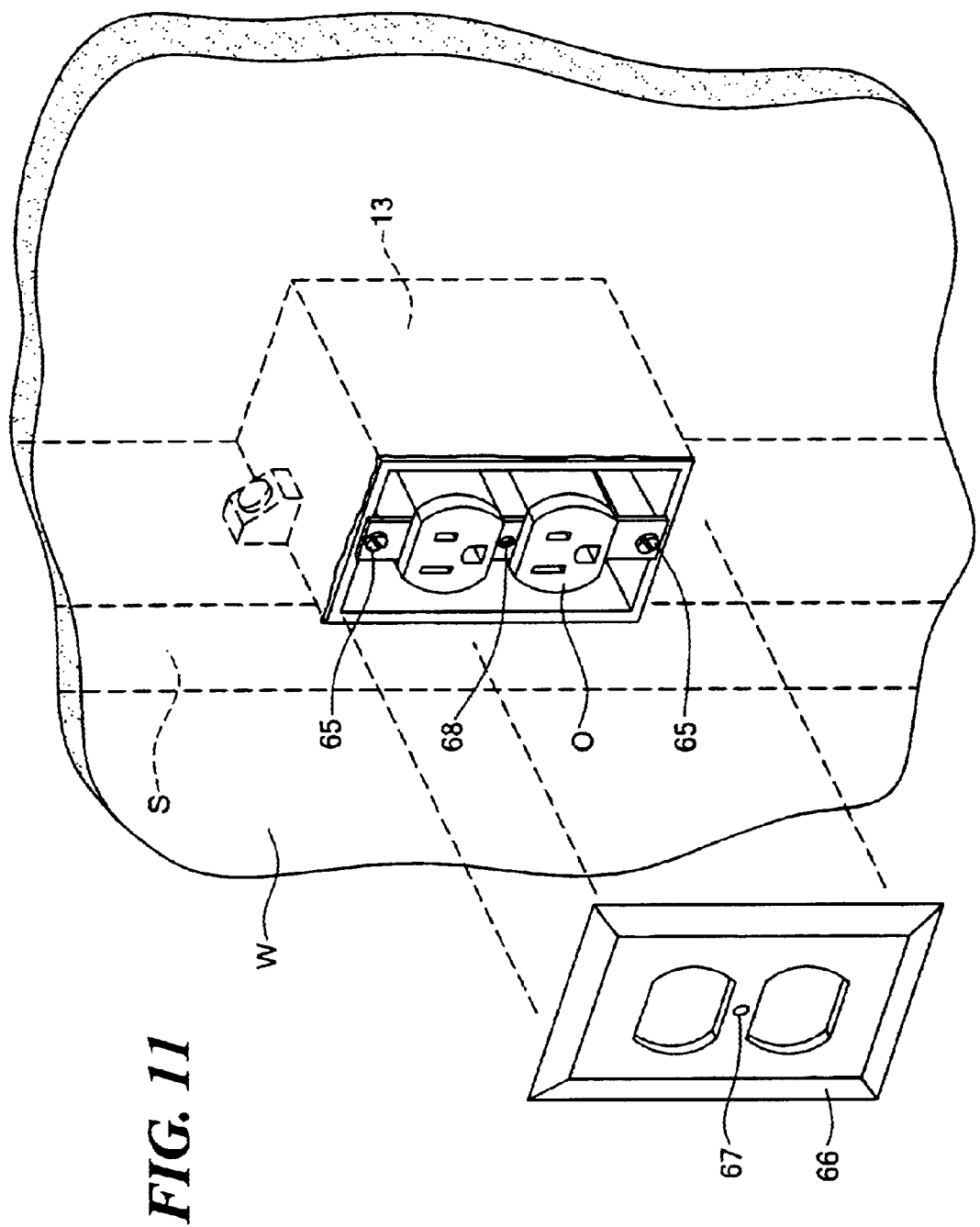
FIG. 11 is an exploded, perspective view of the cover, electrical box and paneling shown in FIG. 9, the electrical box being shown with an electrical outlet mounted thereto, the electrical box being shown with a cover plate aligned for mounting thereto over the electrical outlet.

Upon completion of the wall construction, an electrician removes cover 15 from electrical box 13 using handle 43, as shown in FIG. 10, and either discards cover 15 or stores cover 15 for future use. With cover 15 removed from electrical box 13, the electrician couples outlet O to electrical wires E and fixedly mounts outlet O onto electrical box 13 by passing a pair of screws 65 through a pair of preformed openings in outlet O and into engagement within threaded bores 36 and 38 in electrical box 13. With outlet O electrically coupled to wires E and fixedly mounted onto electrical box 13, a plastic cover plate 66 is mounted over outlet O, as shown in FIG. 11. Specifically, a screw (not shown) is passed through a preformed opening 67 in cover and into engagement with a threaded bore 68 which is formed in outlet O.

As noted briefly above, cover 15 is not limited in its size and shape. Rather, the size and shape of cover 15 could be modified to enable cover 15 to be mounted on different types of electrical boxes without departing from the spirit of the present invention.

Figure 12:
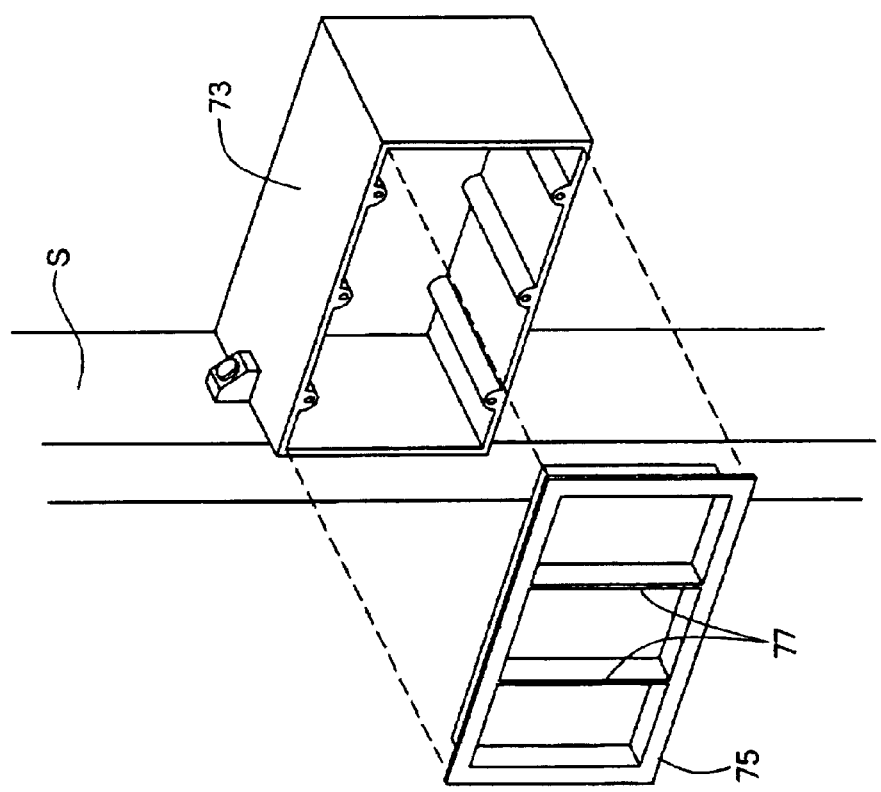
FIG. 12 is a perspective, exploded view of a second embodiment of a cover for an electrical box constructed according to the teachings of the present invention, the cover being shown aligned for mounting onto an electrical box which, in turn, is mounted on an associated support beam.
Figure 15:
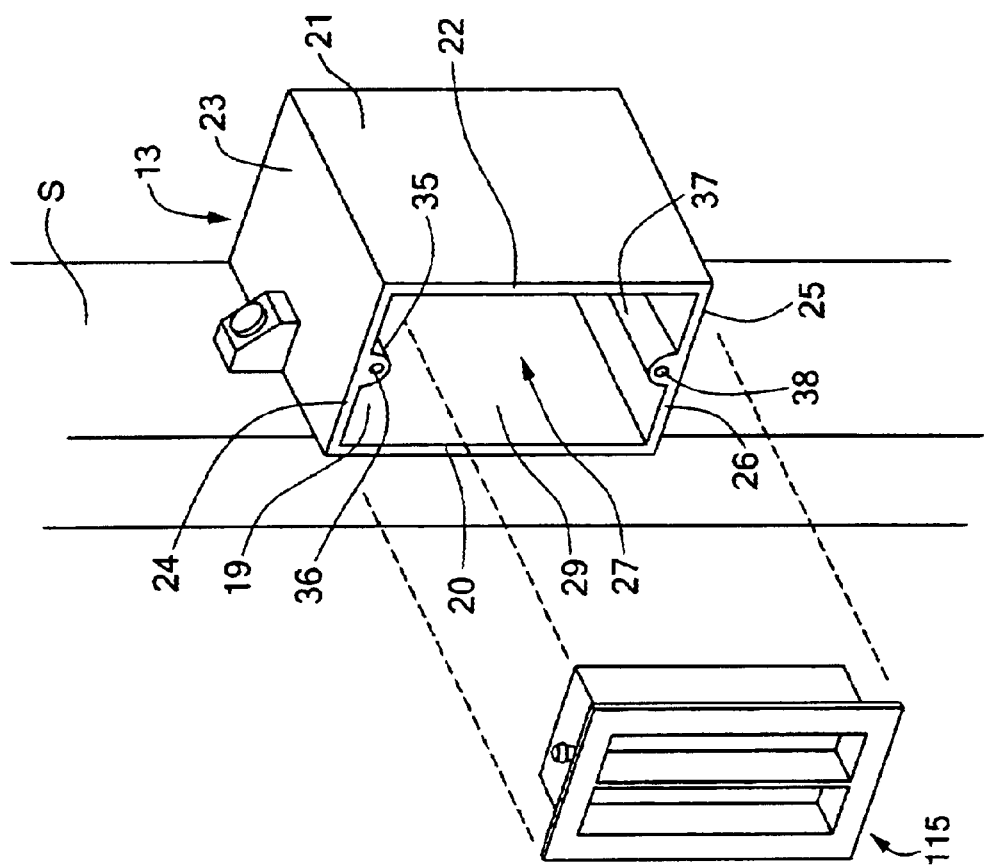
FIG. 15 is a perspective, exploded view of the cover assembly and the electrical box shown in FIG. 14, the electrical box being shown mounted on an associated support beam.

As an example, referring now to FIG. 12, there is disclosed a second embodiment of a cover which is adapted to be removably mounted onto an electrical box, said cover being constructed according to the teachings of the present invention. For purposes of identification, the electrical box is represented generally by reference numeral 73 and the cover is represented generally by reference numeral 75.

Electrical box 73 is a conventional new-work, electrical wall box which differs from electrical box 13 only in that electrical box 73 is a three gang electrical box (i.e., designed to be used as a mounting structure for three electrical devices), whereas electrical box 13 is a single gang electrical box (i.e., designed to be used as a mounting structure for a single electrical device). Accordingly, cover 75 differs from cover 15 in that cover 75 is substantially larger than cover 15. Specifically, cover 75 is sized and shaped to be removably mounted onto electrical box 73, which is considerably larger than electrical box 13, and includes a pair of handles 77 to facilitate handling cover 75.

Figure 13:
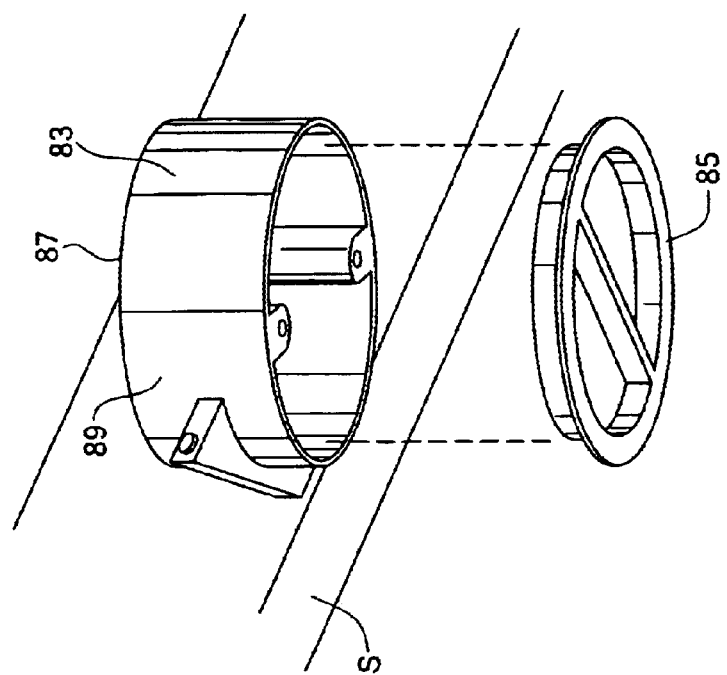
FIG. 13 is a perspective, exploded view of a third embodiment of a cover for an electrical box constructed according to the teachings of the present invention, the cover being shown aligned for mounting onto an electrical box which, in turn, is mounted onto an associated support beam.

As another example, referring now to FIG. 13, there is disclosed a third embodiment of a cover which is adapted to be removably mounted onto an electrical box, said cover being constructed according to the teachings of the present invention. For purposes of identification, the electrical box is represented generally by reference numeral 83 and the cover is represented generally by reference numeral 85.

Electrical box 83 is a conventional new-work, electrical box which differs from electrical box 13 only in that electrical box 83 is designed to be used as a ceiling box, whereas electrical box 13 is designed to be used as a wall box. As such, electrical box 83 preferably has a generally circular shape and comprises a circular back panel 87 and a single circular side panel 89 which extends orthogonally out from back panel 87. Accordingly, cover 85 differs from cover 15 in that cover 85 is generally circular in shape so as to enable cover 85 to be removably mounted onto electrical box 83.

Referring now to FIGS. 14–23, there is disclosed a fourth embodiment of a cover assembly which is adapted to be removably mounted onto an electrical box, said cover assembly being constructed according to the teachings of the present invention and identified generally by reference numeral 115.

Cover assembly 115 differs from cover 15 in that cover assembly 115 is constructed to be removably mounted onto electrical box 13 using a spring-loaded mounting technique, as will be described further in detail below, whereas cover 15 is constructed to be removably mounted onto electrical box 13 using a press-fit mounting technique.

As noted above, electrical box 13 is a conventional new-work, electrical wall box which is constructed out of a nonmetallic material, such as plastic. Electrical box 13 is represented herein as a single gang electrical box (i.e., an electrical box which is sized and shaped to receive a single electrical outlet). However, it is to be understood that cover 115 is not limited for use with single gang electrical boxes. Rather, cover 115 could be modified in size and shape to be used in conjunction with electrical boxes which differ in size, shape and material, as will be described further in detail below.

Cover assembly 115 comprises a cover 116 and a spring-loaded retention device 117 which is slidably mounted onto cover 116.

Cover 116 is preferably constructed of a durable and inexpensive material, such as plastic which can be molded, and comprises a solid support block 119, a flange 121, a handle 123 and a fixed mounting post 125 which are integrally formed together to make cover 116 a single piece. However, it should be noted that cover 116 is not limited to having a one-piece construction. Rather, cover 116 could alternatively be constructed of multiple pieces without departing from the spirit of the present invention.

With cover assembly 115 mounted onto electrical box 13 over open front end 29, cover 116 is sized and shaped to enclose interior cavity 27. In this manner, cover 116 serves to protect electrical wiring which is disposed within interior cavity 27 and to prevent debris, such as dust or plaster, from collecting within interior cavity 27, which is highly desirable.

Support block 119 is a solid block of material which includes a top wall 126, a bottom wall 127, a front wall 129, a rear wall 131, a first sidewall 133 and a second sidewall 134.

Support block 119 is also shaped to include an elongated bore 135. Elongated bore 135 is preferably uniformly circular in lateral cross-section and includes a longitudinal axis L. Elongated bore 135 is formed into bottom wall 127 proximate rear wall 131 and extends up a portion of the distance to top wall 126. Bore 135 is defined partially by a closed end 136 located between top wall 126 and bottom wall 127 and an open end 137 located in bottom wall 127.

Figure 14:
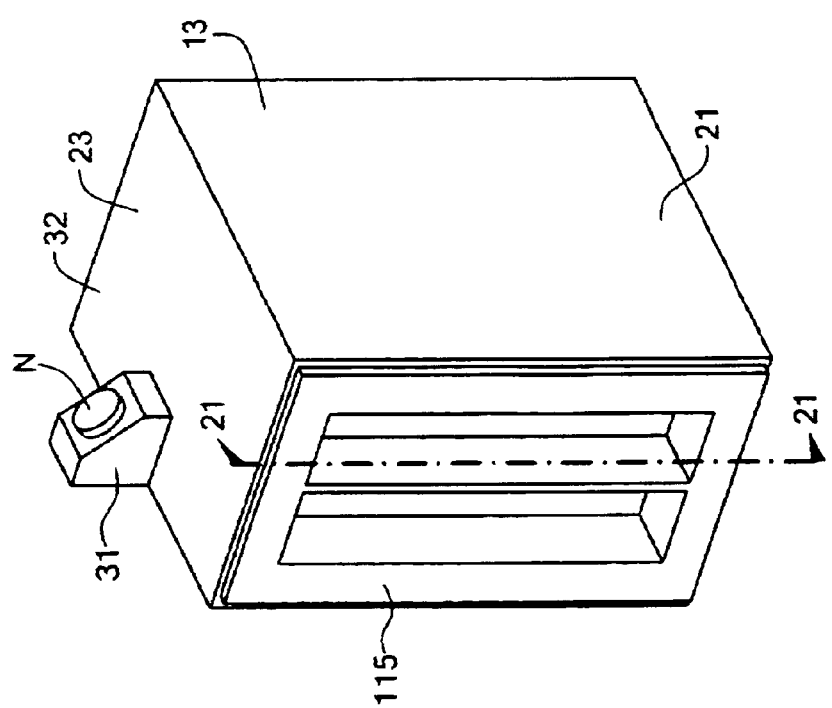
FIG. 14 is a front perspective view of a fourth embodiment of a cover assembly for an electrical box constructed according to the teachings of the present invention, the cover assembly being shown mounted onto an electrical box.
Figure 18:
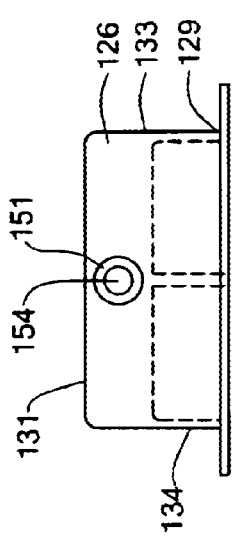
FIG. 18 is a top plan view of the cover assembly shown in FIG. 16.
Figure 17:
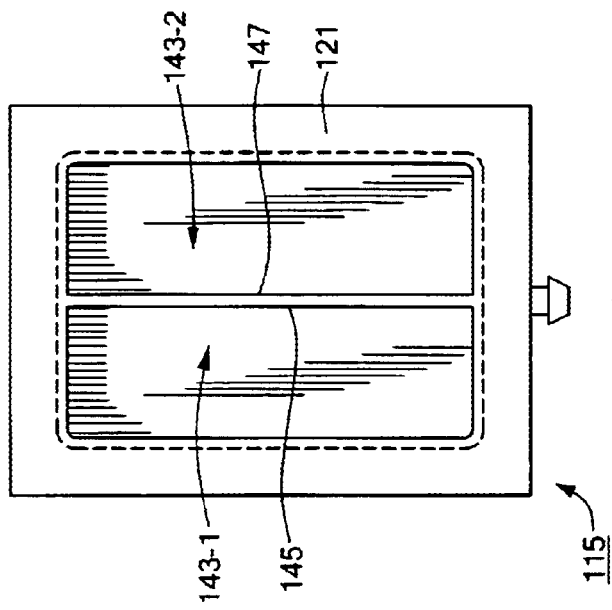
FIG. 17 is a front plan view of the cover assembly shown in FIG. 16.
Figure 16:
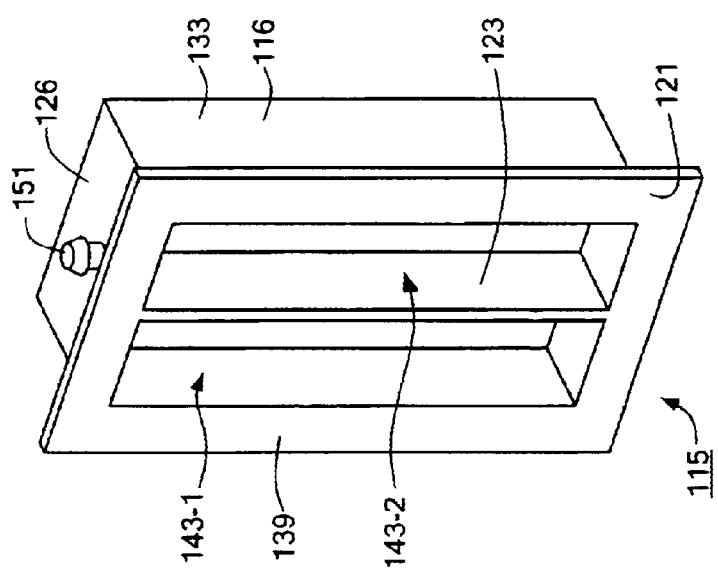
FIG. 16 is a front perspective view of the cover assembly shown in FIG. 14.
Figure 19:
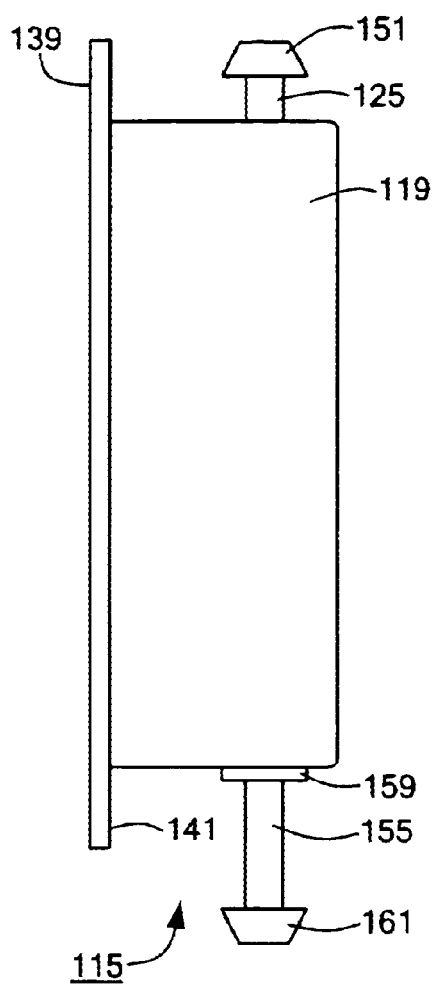
FIG. 19 is a right side plan view of the cover assembly shown in FIG. 16.
Figure 20:
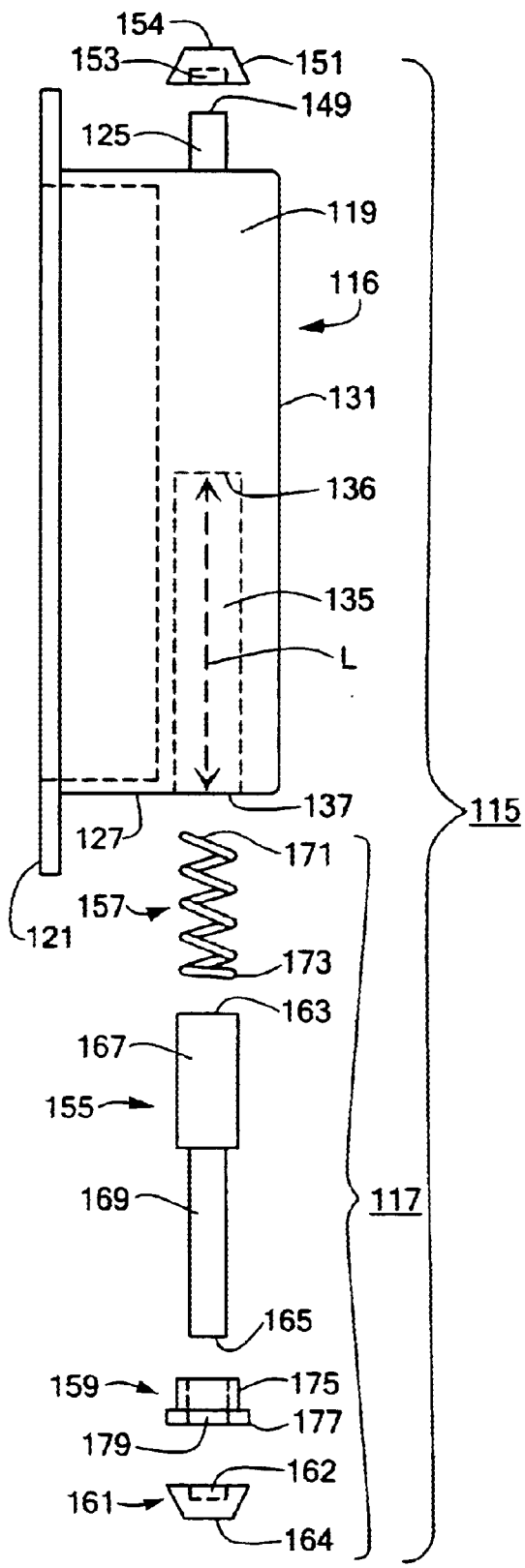
FIG. 20 is an exploded right side plan view of the cover assembly shown in FIG. 16.
Figure 23:
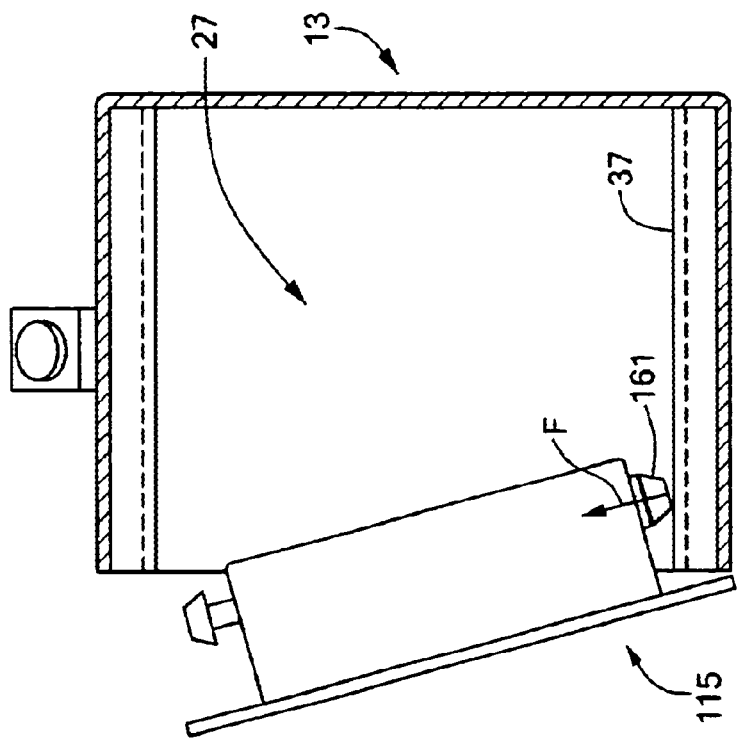
FIGS. 23(a)–(d) show a sequence of right side views of the cover assembly shown in FIG. 14 as the cover assembly is mounted onto the electrical box, the electrical box being shown in section along lines 21—21.
Figure 23:
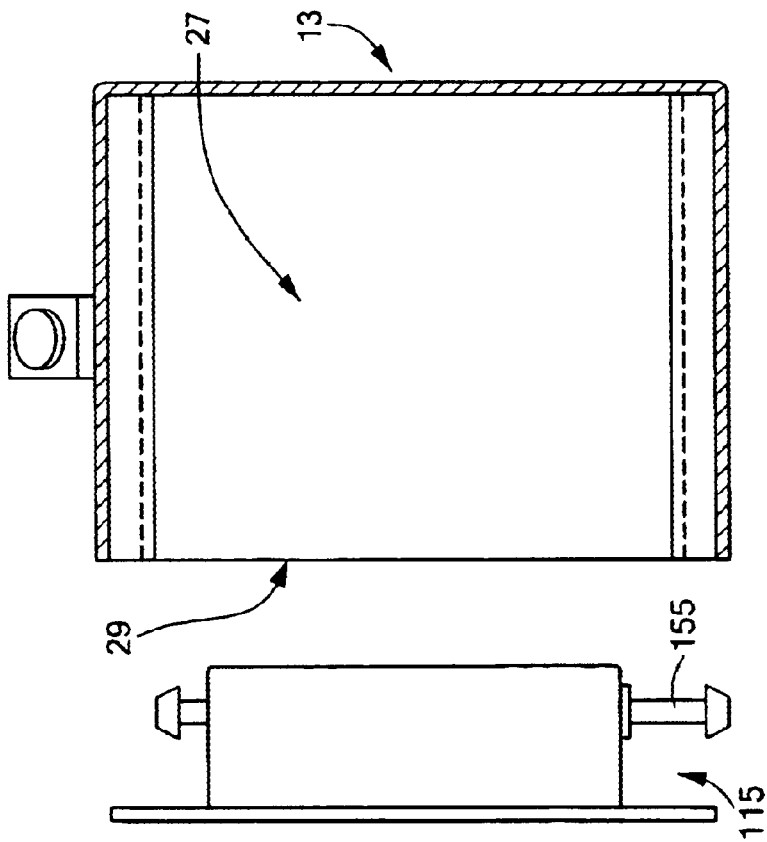
Figure 23:
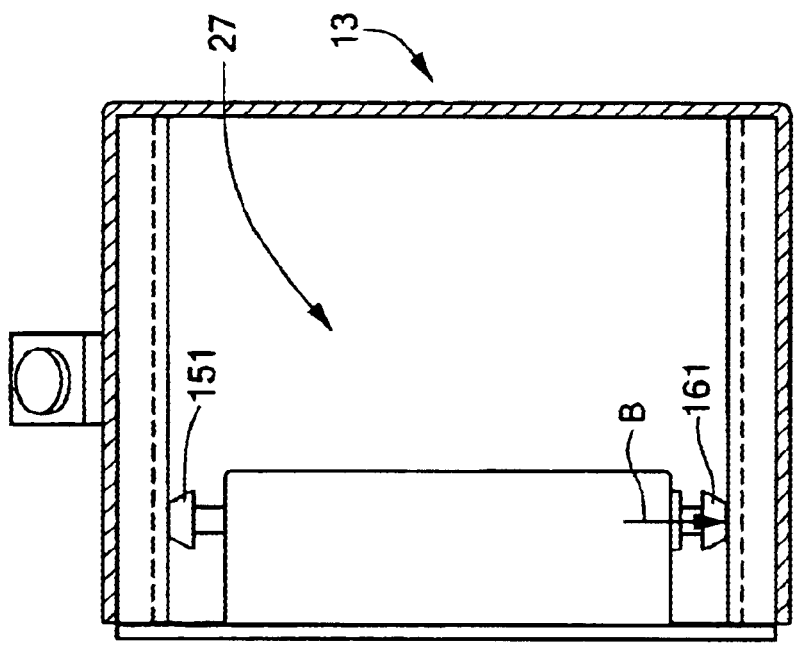
Figure 23:
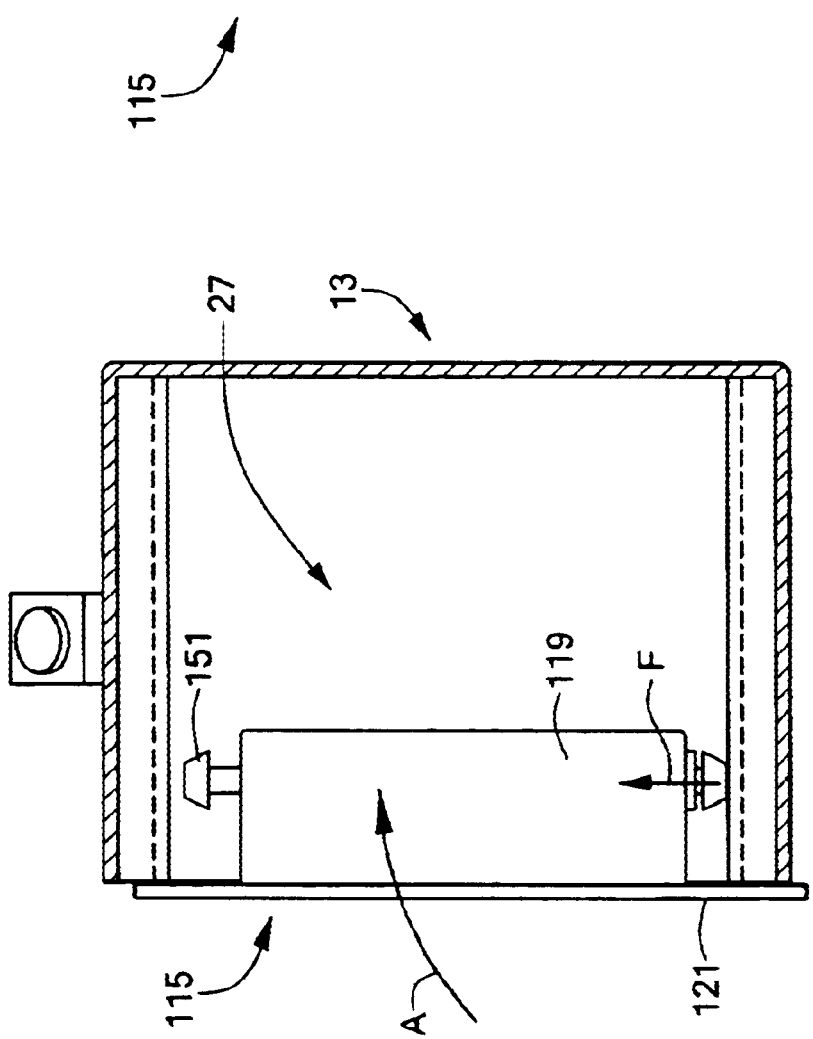
Figure 24:
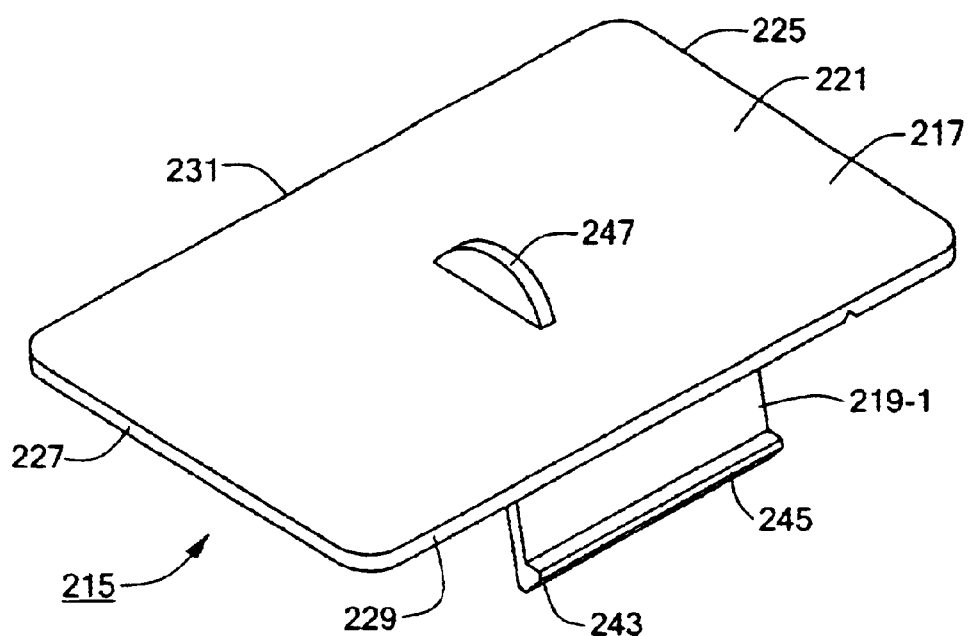
FIG. 24 is a front perspective view of a fifth embodiment of a cover for an electrical box constructed according to the teachings of the present invention.
Figure 25:
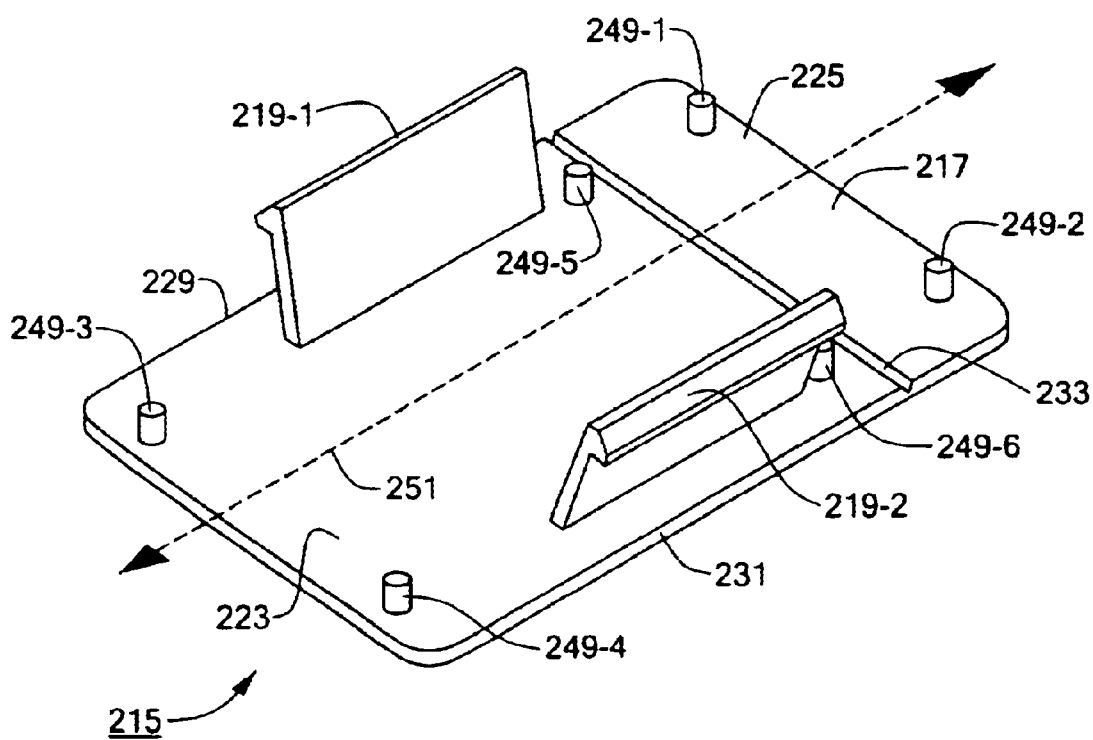
FIG. 25 is a rear perspective view of the cover shown in FIG. 24.

Flange 121 is integrally formed onto the outer periphery front wall 129 of support block 119 and comprises a generally flat front surface 139 and a generally flat rear surface 141. It should be noted that, with cover 116 mounted onto open front end 29 of electrical box 13, flange 121 is sized and shaped so that rear surface 141 abuts against electrical box 13 at open front end 29, as shown in FIG. 14, so as to prevent cover 116 from being disposed entirely within interior cavity 27.

A pair of spaced apart cavities 143-1 and 143-2 are formed into front wall 129 of support block 119. It should be noted that cavities 143 are relatively shallow and extend only a portion of the distance from front wall 129 to rear wall 131. Together cavities 143 define handle 123 for holding cover 116. Specifically, handle 123 is generally rectangular in shape and extends vertically between cavities 143 from top wall 126 to bottom wall 127. Handle 123 comprises a pair of finger gripping surfaces 145 and 147 onto which the operator grasps in order to mount cover 115 onto electrical box 13 and, similarly, to removing cover 115 from electrical box 13, as will be described further in detail below.

Handle 123 is shown as being generally in the shape of a thin rectangular panel. However, it is to be understood that handle 123 could be formed into alternative shapes, such as a C-shaped or U-shaped handle, without departing from the spirit of the present invention.

Fixed mounting post 125 is integrally formed onto support block 119 and extends perpendicularly out from top wall 126. Mounting post 125 is generally circular in lateral cross-section and comprises a free end 149. As will be described further in detail below, fixed mounting post 125 functions in conjunction with retention device 117 to secure cover assembly 115 onto electrical box 13. However, it should be noted that fixed mounting post 125 could be removed from cover assembly 115 without significantly compromising the ability of retention device 117 to secure cover assembly 115 onto electrical box 13.

Cover 116, if made of plastic, may be fabricated using conventional plastic molding techniques. If cover 116 is fabricated using conventional plastic molding techniques, bore 135 may be formed during the molding process or may be drilled into block 119 after the molding process is completed.

A stopper 151, constructed preferably of rubber, is mounted onto free end 149. Specifically, stopper 151 includes a circular opening 153 which is sized and shaped to receive free end 149 of post 125 and a contact surface 154. Stopper 151 may be secured onto free end 143 of post 123 using an adhesive or by sizing post 125 so that free end 149 is securely press-fit within opening 153.

Spring-loaded retention device 117 is slidably mounted onto support block 119 of cover 116 and functions in conjunction with fixed mounting post 125 to secure cover assembly 115 onto electrical box 13, as will be described further in detail below.

Spring-loaded retention device 117 comprises a movable mounting post 155, a compression spring 157, a washer 159 and a stopper 161.

Movable mounting post 155 is a generally cylindrical post which is sized and shaped to be slidably disposed within elongated bore 135, mounting post 155 comprising a first end 163 and a second end 165. It should be noted that mounting post 155 has a tapered lateral cross-sectional area so as to define an enlarged portion 167 proximate first end 163 and a reduced portion 169 proximate second end 165, the diameter of enlarged portion 167 being greater than the diameter of reduced portion 169.

Compression spring 157 is sized and shaped to be disposed within elongated bore 135 and comprises a first end 171 and a second end 173.

Washer 159 is an integral piece constructed of an inexpensive and durable material, such as plastic, and comprises an internal ring 175, an external ring 177 integrally formed onto internal ring 175 and a central opening 179 which extends through internal ring 175 and external ring 177. It should be noted that central opening 179 is sized and shaped to enable reduced portion 169 of mounting post 155 to pass therethrough, but is sized and shaped to preclude enlarged portion 167 of mounting post 155 to pass therethrough. As will be described further in detail below, washer 159 is sized and shaped to be mounted onto open end 137 of bore 135.

Stopper 161, constructed preferably of rubber, includes a circular opening 162 which is sized and shaped to receive second end 165 of post 155 and a contact surface 164. Stopper 161 may be secured onto second end 165 of post 155 using an adhesive or by sizing post 155 so that second end 165 is securely press-fit within opening 162.

Spring loaded retention device 117 is positioned within support block 119 in the following manner. Compression spring 157 is disposed into bore 135 such that first end 171 of spring 157 contacts closed end 136. With compression spring 157 positioned as such, mounting post 155 is disposed within bore 135 such that first end 163 contacts second end 173 of spring 157. With mounting post 155 disposed within bore 135 in this manner, reduced portion 169 of post 155 extends out open end 137 and protrudes perpendicularly away from bottom wall 127. As can be appreciated, mounting post 155 is capable of being slidably displaced within elongated bore 135 along longitudinal axis L, compression spring 157 naturally biasing mounting post 155 away from closed end 136.

Having disposed spring 157 and post 155 into bore 135 in support block 119, washer 159 is mounted onto open end 137 of support block 119. Specifically, washer 159 is mounted onto open end 137 of support block 119 such that internal ring 175 is positioned within elongated bore 135 and external ring 177 is positioned outside of elongated bore 135.

Washer 159 is preferably sized and shaped to be securely press-fit into elongated bore 135. However, it is to be understood that washer 159 could be retained onto open end 137 of support block 119 by alternative means without departing from the spirit of the present invention. As an example, washer 159 could be retained onto open end 137 of support block 119 using an adhesive. As another example, washer 159 and/or elongated bore 135 could be shaped to enable washer 159 to be snap-fit onto open end 137 of support block 119.

It should be noted that with washer 159 mounted onto open end 137 in this manner, reduced portion 169 of mounting post 155 projects through central opening 179. As can be appreciated, washer 159 serves to retain enlarged portion 167 of mounting post 155 within elongated bore 135. Specifically, compression spring 157 naturally biases mounting post 155 outward away from closed end 136. However, because the diameter of enlarged portion 167 is larger than the diameter of opening 179, mounting post 155 is not capable of further outward displacement once enlarged portion 167 abuts against internal ring 175, as shown in FIG. 21.

With compression spring 157 and mounting post 155 slidably disposed within elongated bore 135 and with washer 159 mounted onto open end 137 of support block 119, rubber stopper 161 is mounted onto second end 165 of mounting post 155. As can be appreciated, the application of an inward force F onto contact surface 164 of rubber stopper 161 causes mounting post 155 to inwardly displace along longitudinal axis L, as shown in FIG. 22. Furthermore, it should be noted that rubber stopper 161 limits the inward displacement of mounting post 155. Specifically, as mounting post 155 is inwardly displaced, once rubber stopper 161 contacts external ring 177 of washer 159, mounting post 155 is incapable of further inward displacement.

Cover assembly 115 mounts onto electrical box 13 in the following manner. With cover assembly 115 removed from electrical box, compression spring 157 resiliently urges mounting post 155 outward, as shown in FIG. 23(a).

Using handle 123, cover assembly 115 is brought towards electrical box 13 in such a manner so that surface 164 of rubber stopper 161 is drawn into contact with bottom panel 25 or projection 37 formed onto bottom panel 25, cover 116 being disposed with rubber stopper 151 on fixed mounting post 125 disposed outside of cavity 27 of electrical box 13. With contact surface 164 of rubber stopper 161 abutting against electrical box 13 in this manner, the user is required to apply a substantially downward force onto cover 116, thereby creating inward force F onto stopper 161, as shown in FIG. 23(b). Inward force F applied to stopper 161 causes mounting post 155 to displace inward within elongated bore 135 along longitudinal axis L.

While maintaining the substantially downward force onto cover 116, the user pivots cover 116 in a clockwise direction about rubber stopper 161, as represented by arrow A in FIG. 23(c), until rubber stopper 151 on fixed mounting post 125 is disposed within cavity 27 of electrical box 13. As such, support block 119 is entirely disposed inside cavity 27 and flange 121 is entirely disposed outside cavity 27.

With rubber stoppers 151 and 161 disposed inside cavity 27, the user stops applying the downward force onto cover 116 which, in turn, eliminates inward force F applied onto stopper 161. Upon the elimination of inward force F onto rubber stopper 161, compression spring 157 urges mounting post 155 outward, as represented by arrow B in FIG. 23(d), until both rubber stoppers 151 and 161 abut against electrical box 13.

Cover assembly 115 can be removed from electrical box 13 using the reverse sequence of steps enumerated above for mounting cover assembly 115 onto electrical box 13.

As can be appreciated, the resilient outward force applied by compression spring 157 onto mounting post 155 enables cover assembly 115 to be spring-loaded onto electrical box 13. As a result, cover assembly 115 remains securely mounted onto electrical box during use, which is highly desirable.

Referring now to FIGS. 24–31, there is disclosed a fifth embodiment of a cover which is adapted to be removably mounted onto an electrical box, said cover being constructed according to the teachings of the present invention and identified generally by reference numeral 215.

Cover 215 differs from cover 15 in that cover 215 is constructed to be removably mounted onto electrical box 13 using a pair of flexible retaining wings, as will be described further in detail below, whereas cover 15 is constructed to be removably mounted onto electrical box 13 using a press-fit mounting technique.

As noted above, electrical box 13 is a conventional new-work, electrical wall box which is preferably constructed out of a nonmetallic material, such as plastic. Electrical box 13 is represented herein as a single gang electrical box (i.e., an electrical box which is sized and shaped to receive a single electrical outlet). However, it is to be understood that cover 215 is not limited for use with single gang electrical boxes. Rather, cover 215 could be modified in size and shape to be used in conjunction with electrical boxes which differ in size and shape, as will be described further in detail below.

Cover 215 is preferably constructed of a durable and inexpensive material which can be molded, such as plastic. Cover 215 comprises a substantially flat plate 217 and a pair of retention wings 219-1 and 219-2 which are integrally formed onto flat plate 217 so as to render cover 215 a unitary device. However, it should be noted that cover 215 is not limited to having a one-piece construction. Rather, cover 215 could be alternatively constructed from multiple pieces without departing from the spirit of the present invention.

With cover 215 mounted onto electrical box 13, flat plate 217 is sized and shaped to cover open front end 29 and enclose interior cavity 27. In this manner, flat plate 217 serves to protect electrical wiring which is disposed within interior cavity 27 and to prevent debris, such as dust or plaster, from collecting within interior cavity 27, which is highly desirable.

Flat plate 217 is generally rectangular in shape and includes a front surface 221, a rear surface 223, a top edge 225, a bottom edge 227, a right side edge 229 and a left side edge 231. Flat plate 217 has an overall length L1 of approximately 3.73 inches and an overall width W1 of approximately 2.23 inches.

It should be noted that flat plate 217 is sized and shaped to enclose interior cavity 27 of a standard, one gang, electrical box 13 which is constructed out of plastic. However, it is to be understood that a standard, one gang, electrical box which is constructed of metal is typically smaller in size than a standard, one gang, electrical box which is constructed of plastic. Accordingly, flat plate 217 is shaped to include a line of weakness 233. Specifically, line of weakness 233 is in the form of a V-shaped groove which is formed into rear surface 223 of flat plate 217, line of weakness 233 extending laterally across flat plate 217 from right side edge 229 to left side edge 231. Line of weakness 233 is spaced in slightly from top edge 225 so as to provide flat plate 217 with a length L2 from bottom edge 227 to line of weakness 233 which is approximately 3.00 inches.

As noted above, flat plate 215 is sized and shaped to enclose the open front end 29 of the larger sized, one gang, electrical box. However, in order to use cover 215 with the smaller sized, one gang, electrical box, the user is required to break flat plate 215 through line of weakness 233, such as by bending flat plate 215 by hand. After discarding the portion of flat plate 215 from line of weakness 233 to top edge 225, the remaining portion of cover 215 is properly sized to enclose the open front end of the smaller sized, one gang, electrical box, which is highly desirable.

Wings 219 are formed onto rear surface 223 of flat plate 217 in a spaced apart relationship. Specifically, first wing 219-1 is formed onto rear surface 223 of flat plate 217 and is spaced slightly in from right side edge 229, as seen most clearly in FIG. 25. Similarly, second wing 219-2 is formed onto rear surface 223 of flat plate 217 and is spaced slightly in from left side edge 231. It should be noted that wings 219 project rearwardly out from rear surface 223 of flat plate 217 at an angle away from each other, as will be described further in detail below.

Figure 30:
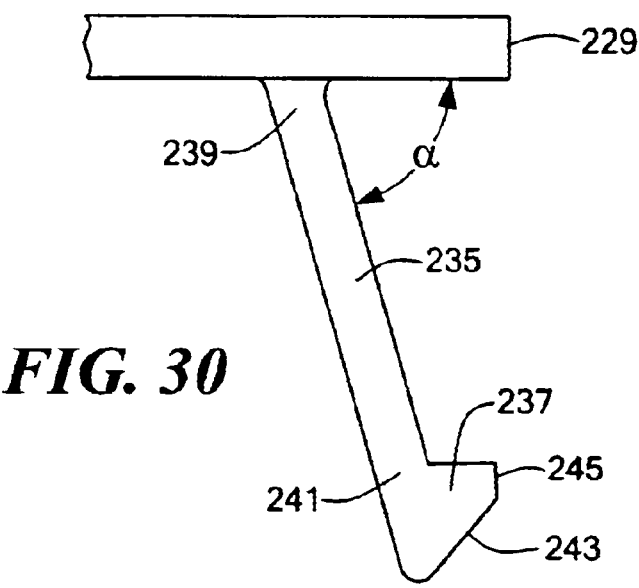
FIG. 30 is an enlarged, fragmentary, bottom plan view of the cover shown in FIG. 24.

As seen most clearly in FIG. 30, each wing 219 comprises an elongated leg 235, which is integrally formed and extends out from rear surface 223 of flat plate 217, and a foot 237, which is formed onto the free end of leg 235.

Leg 235 is elongated generally rectangularly shaped straight (i.e. flat) member which is generally rectangular in longitudinal cross-section, extends along a portion of the length of flat plate 217, has a width W2 of approximately 1.50 inches and is spaced inward from bottom edge 227 a length L3 of approximately 1.13 inches. Leg 235 comprises a first end 239, which is integrally formed onto rear surface 223 of flat plate 217, and a second end 241. It should be noted that leg 235 extends rearwardly out from rear surface 223 of flat plate 217 at an angle α which is approximately 75 degrees and extends down from flat plate 215 a distance D1 of approximately 0.50 inches. As will be described further below, each leg 235 is capable of limited inward flexion upon the application of a significant inward force thereonto, each leg 235 resiliently returning to its original orientation upon the removal of the significant inward force.

Foot 237 is an elongated, enlarged member which is integrally formed onto second end 241 of leg 235 along its length. Foot 237 comprises a tapered guiding surface 243 which serves to facilitate the mounting of cover 215 onto electrical box 13, as will be described further below. Foot 237 also comprises a flat engagement surface 245 having a length L5 of approximately 0.05 inches which frictionally engages the inner surface of electrical box 13 to retain cover 215 onto electrical box 13, as will be described further below. As seen most clearly in FIG. 30, guiding surface 243 is not co-planar with engagement surface 245. The distance D2 from the top of foot 237 to the bottom of foot 237 is approximately 0.35 inches.

A handle 247 for holding cover 215 is integrally formed onto front surface 221. Handle 247 is shown as being in the shape of a flat, semi-circular member. However, it is to be understood that handle 247 is not limited to having a flat, semi-circular shape. Rather, handle 247 could be alternatively constructed in any shape useful for handling cover 215 without departing from the spirit of the present invention.

A first pair of spaced apart posts 249-1 and 249-2 are formed onto rear surface 223 along top edge 225. A second pair of spaced apart posts 249-3 and 249-4 are formed onto rear surface 223 along bottom edge 227. A third pair of spaced apart posts 249-5 and 249-6 are formed onto rear surface 223 along line of weakness 233.

Each post 249 is generally circular in lateral cross-section and is integrally formed onto flat plate 215 to render cover 215 a unitary device. With cover 215 mounted onto electrical box 13, posts 249 are sized and shaped to project into interior cavity 27. In this manner, posts 249 serve to limit displacement of cover 215 in the direction parallel to its longitudinal axis 251 when cover 215 is mounted onto electrical box 13, which is highly desirable while wings 219 limit displacement of cover 215 in the direction perpendicular to its longitudinal axis 251.

Figure 31C:
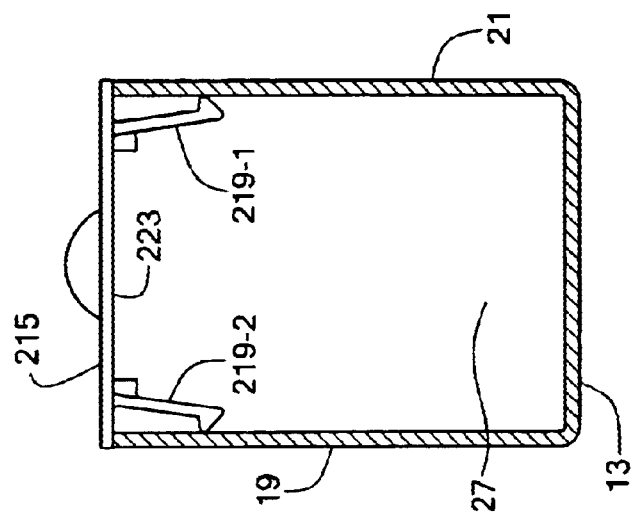
FIGS. 31(a)–(c) show a sequence of bottom plan views of the cover shown in FIG. 24 as the cover is mounted onto an electrical box, the electrical box being shown in section.
Figure 31B:
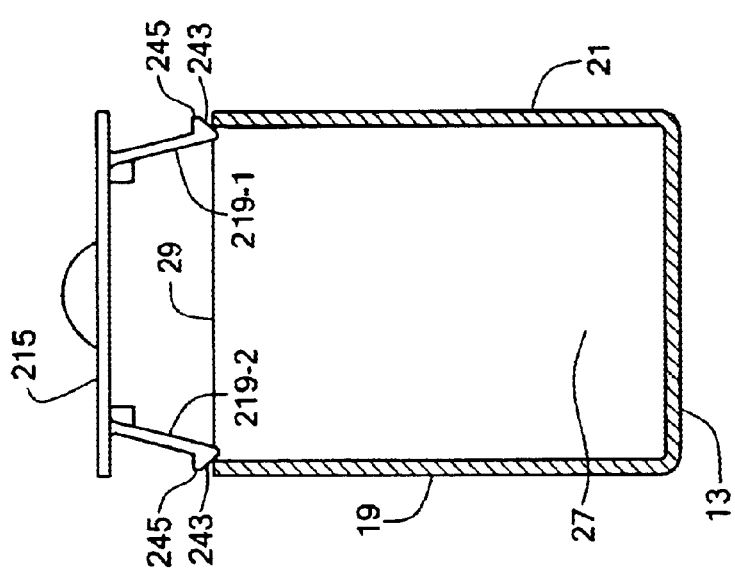
Figure 31A:
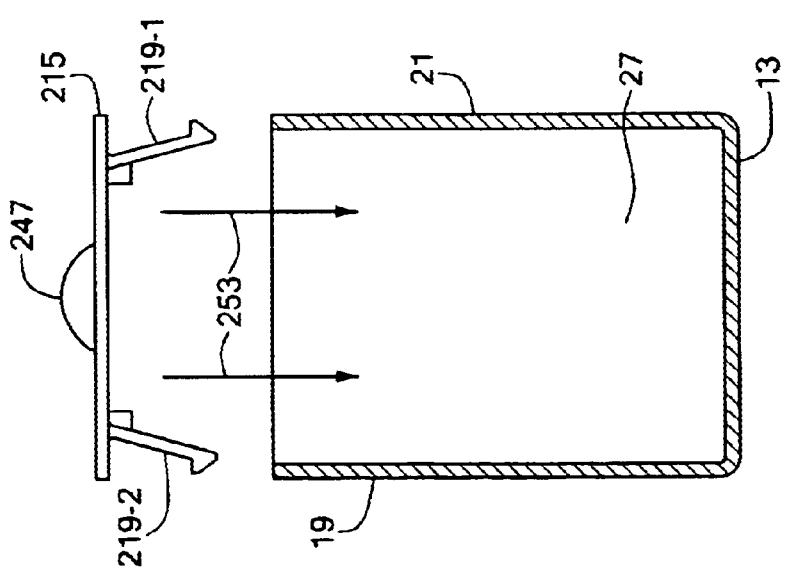

Referring now to FIGS. 31(a)–(c), cover 215 mounts onto electrical box 13 in the following manner. Using handle 247, cover 215 is urged towards electrical box 13 in the direction represented by arrows 253 in FIG. 31(a).

As cover 215 is disposed over open front end 29 of electrical box 13, tapered guiding surface 243 of wing 219-2 is drawn into contact against the free end of left side panel 19 and tapered guiding surface 243 of wing 219-1 is drawn into contact against the free end of right side panel 21, as shown in FIG. 31(b).

As cover 215 is further urged toward electrical box 13, the tapered shape of guiding surface 243 causes left side panel 19 and right side panel 21 to inwardly flex wings 219 in such a manner so that engagement surface 245 of wing 219-2 lies flush against the inner surface of left side panel 19 and so that the engagement surface 245 of wing 219-1 lies flush against the inner surface of right side panel 21. Cover 215 is advanced onto electrical box 13 until rear surface 223 of flat plate 215 abuts against open front end 29 of electrical box 13, as shown in FIG. 31(c).

With cover 215 mounted onto electrical box 13 in the manner shown in FIG. 31(c), flat plate 215 covers open front end 29 and encloses interior cavity 27. Furthermore, it should be noted that the construction of cover 215 causes flexible wings 219 to resiliently urge in the outward direction so that engagement surface 245 of wings 219 frictionally contacts side panels 19 and 21 of electrical box 13, thereby creating a frictional retaining force of cover 215 onto electrical box 13, which is highly desirable.

The application of a withdrawal force onto cover 215 which is greater than the frictional force between wings 219 and side panels 19 and 21 will enable cover 215 to be removed from electrical box 13. Subsequent mounting and removal of cover 215 from electrical box 13 can be repeated by the user as deemed necessary.

As noted above, cover 215 is not limited to be being mounted onto electrical box 13. Rather, cover 215 could additionally be mounted onto a smaller sized electrical box in the same manner as described above. However, before mounting cover assembly 215 onto the electrical box, the user is required to break flat plate 215 through line of weakness 233 and discard the portion of flat plate 215 from line of weakness 233 to top edge 225.

It should be noted that cover 215 is not limited in its size and shape. Rather, the size and shape of cover 215 could be modified to enable cover 215 to be mounted on different types of electrical boxes without departing from the spirit of the present invention.

Figure 32:
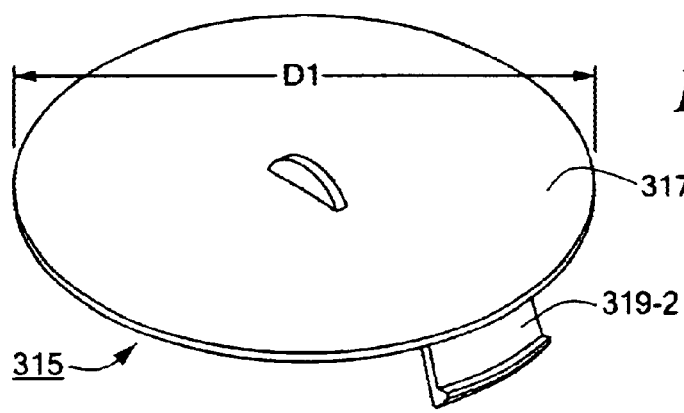
FIG. 32 is a front perspective view of a sixth embodiment of a cover for an electrical box constructed according to the teachings of the present invention.
Figure 33:
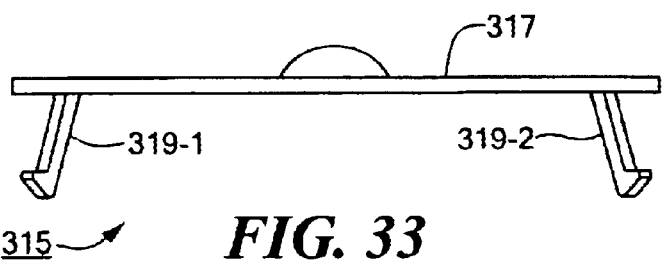
FIG. 33 is a bottom plan view of the cover shown in FIG. 32.

As an example, referring now to FIGS. 32 and 33, there is disclosed a sixth embodiment of a cover which is adapted to be removably mounted onto an electrical box, said cover being constructed according to the teachings of the present invention and identified generally by reference numeral 315.

Cover 315 is similar to cover 215 in that cover 315 comprises a substantially flat plate 317, a handle 318 and a pair of retention wings 319-1 and 319-2 which are integrally formed onto flat plate 317 so as to render cover 315 a unitary device.

Figure 26:
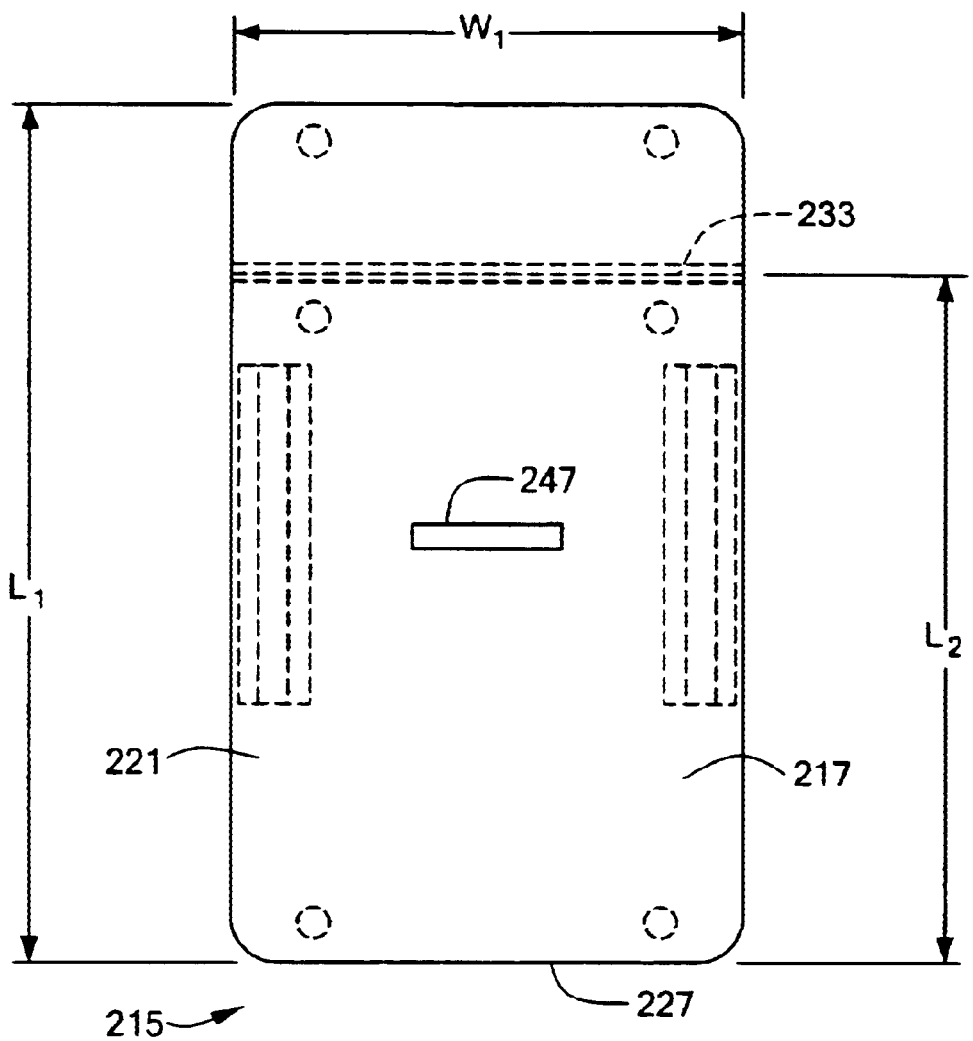
FIG. 26 is a front plan view of the cover shown in FIG. 24.
Figure 27:
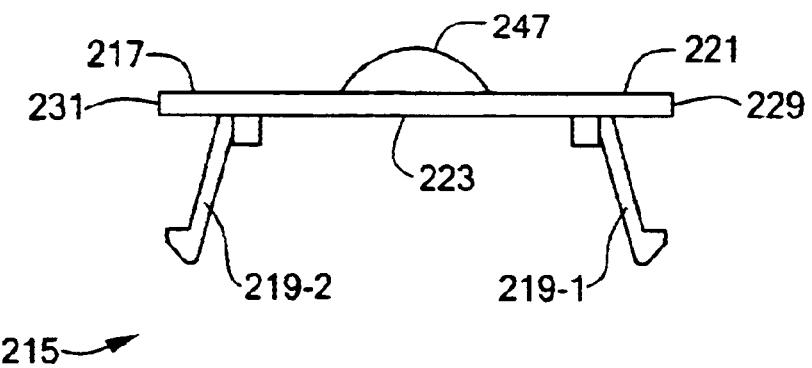
FIG. 27 is a bottom plan view of the cover shown in FIG. 24.
Figure 28:
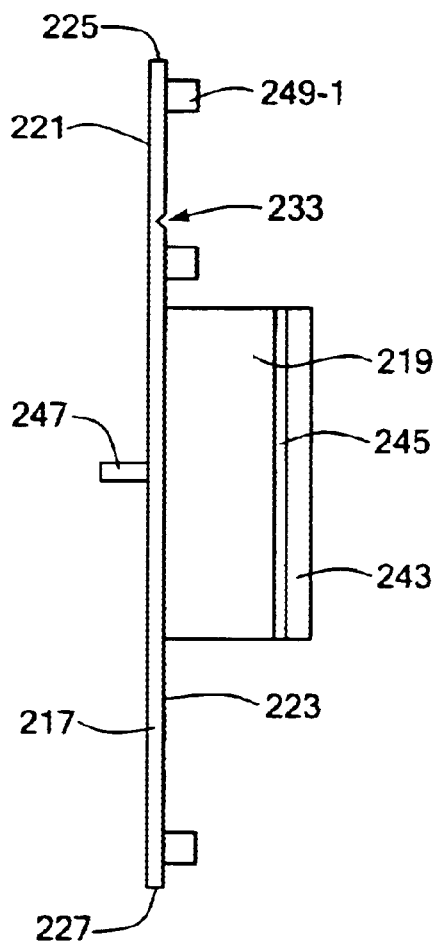
FIG. 28 is a right side plan view of cover shown in FIG. 24.
Figure 29:
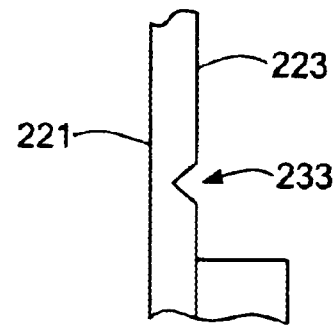
FIG. 29 is an enlarged, fragmentary, right side plan view of the cover shown in FIG. 24.
Figure 32A:
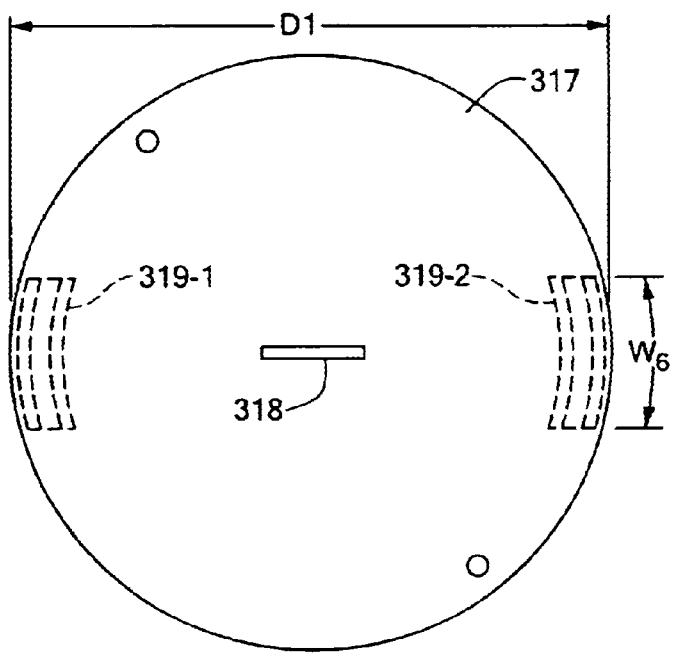
FIG. 32A is a front plant view of the cover shown in FIG. 32.
Figure 32B:
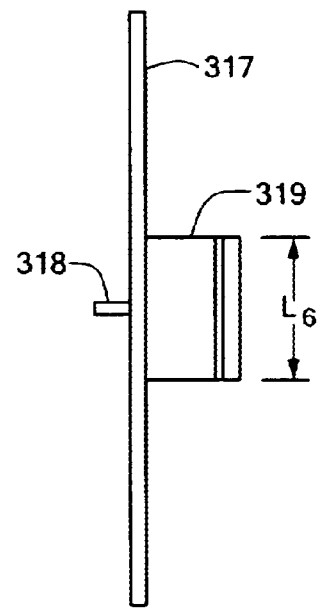
FIG. 32B is a right side plan view of the cover shown in FIG. 32.

The primary distinctions between cover 315 and cover 215 are is that the size and shape of flat plate 317 differs from the size and shape of flat plate 217 and the shape of wings 319 are different from the shape of wings 219. Specifically, flat plate 317 is generally circular in shape and has an overall diameter D1 of approximately 4.02 inches, whereas flat plate 217 is generally rectangular in shape and wings 319 are generally arcuate shaped and spaced 180 degrees apart as shown in FIG. 32A and FIG. 32B rather than straight as shown in FIG. 26. As can be seen in FIG. 32B wings 319 have a length L6 of approximately 1.00 inches. As can be appreciated, posts, such as posts 249 are not needed in this embodiment. As a result, cover 315 is designed primarily for use in conjunction with an electrical box which is circular in shape, such as a ceiling box.

Figure 34:
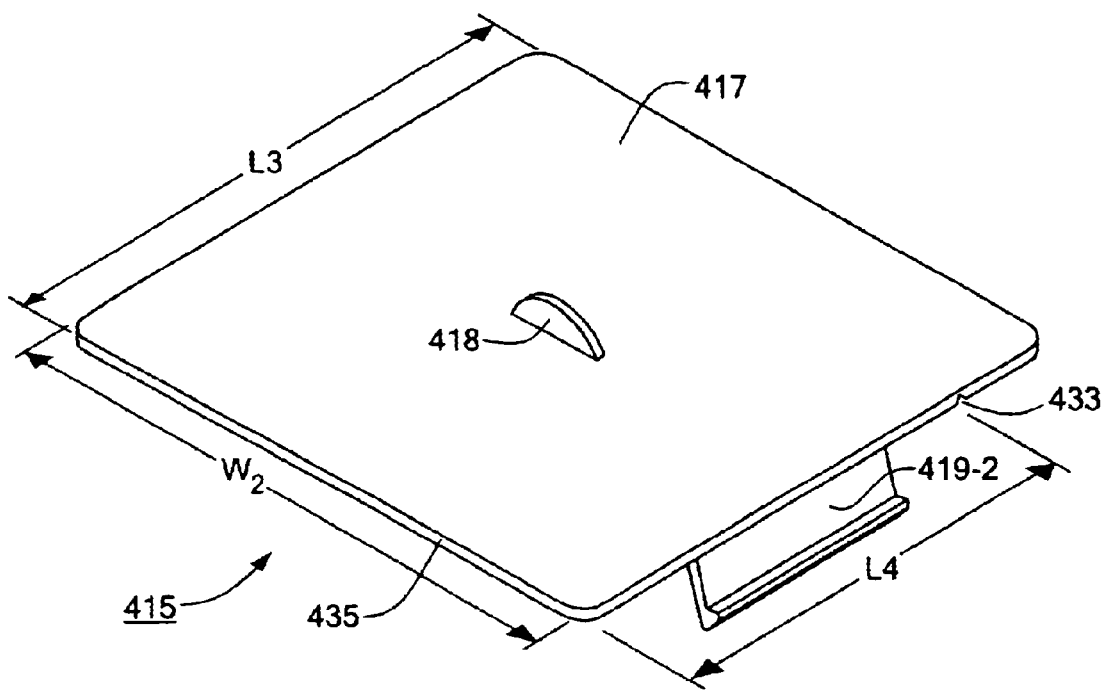
FIG. 34 is a front perspective view of a seventh embodiment of a cover for an electrical box constructed according to the teachings of the present invention.
Figure 35:
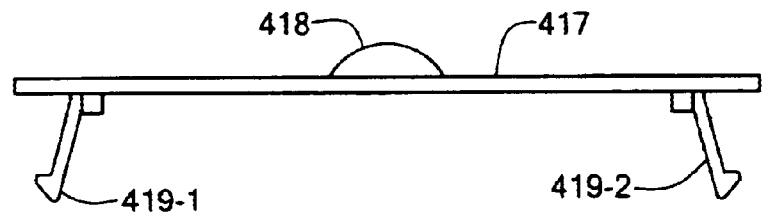
FIG. 35 is a bottom plan view of the cover shown in FIG. 34.

As another example, referring now to FIGS. 34 and 35, there is disclosed a seventh embodiment of a cover which is adapted to be removably mounted onto an electrical box, said cover being constructed according to the teachings of the present invention and identified generally by reference numeral 415.

Cover 415 is similar to cover 215 in that cover 415 comprises a substantially flat plate 417 a handle 418 and a pair of retention wings 419-1 and 419-2 which are integrally formed onto flat plate 417 so as to render cover 415 a unitary device, flat plate 417 being shaped to include a line of weakness 433 which enables cover 415 to be reduced in size.

The primary distinction between cover 415 and cover 215 is that the size and shape of flat plate 417 differs from the size and shape of flat plate 217. Specifically, flat plate 417 is designed primarily for use in conjunction with a two gang electrical box (i.e., an electrical box designed to be used as a mounting structure for two electrical devices), whereas flat plate 217 is designed primarily for use in conjunction with a single gang electrical box (i.e., an electrical box designed to be used as a mounting structure for a single electrical device). Flat plate 417 has an overall length L3 of approximately 3.73 inches and an overall width W2 of 4.05 inches. Furthermore, after breaking cover 415 through line of weakness 433, the remaining portion of flat plate 417 has an overall length L4 of approximately 3.00 inches.

Figure 36:
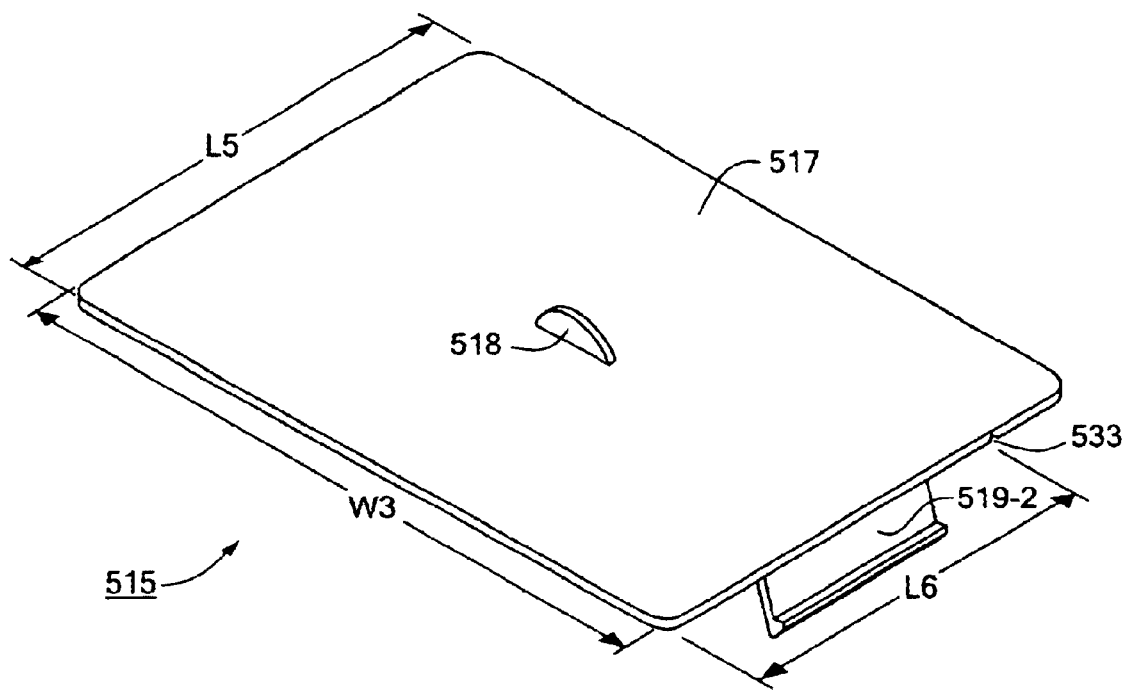
FIG. 36 is a front perspective view of an eighth embodiment of a cover for an electrical box constructed according to the teachings of the present invention.
Figure 37:
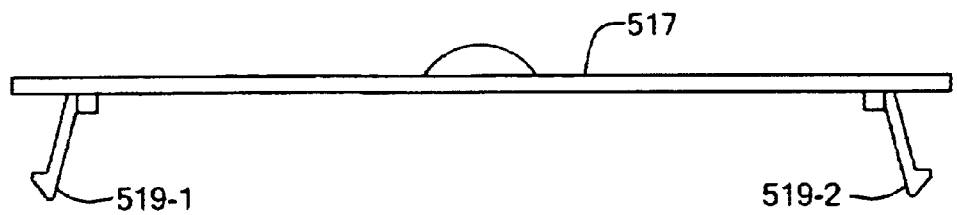
FIG. 37 is a bottom plan view of the cover shown in FIG. 36.

As another example, referring now to FIGS. 36 and 37, there is disclosed an eighth embodiment of a cover which is adapted to be removably mounted onto an electrical box, said cover being constructed according to the teachings of the present invention and identified generally by reference numeral 515.

Cover 515 is similar to cover 215 in that cover 515 comprises a substantially flat plate 517, a handle 518 and a pair of retention wings 519-1 and 519-2 which are integrally formed onto flat plate 517 so as to render cover 515 a unitary device, flat plate 517 being shaped to include a line of weakness 533 which enables cover 515 to be reduced in size.

The primary distinction between cover 515 and cover 215 is that the size and shape of flat plate 517 differs from the size and shape of flat plate 217. Specifically, flat plate 517 is designed primarily for use in conjunction with a three gang electrical box (i.e., an electrical box designed to be used as a mounting structure for three electrical devices), whereas flat plate 217 is designed primarily for use in conjunction with a single gang electrical box (i.e., an electrical box designed to be used as a mounting structure for a single electrical device). Flat plate 517 has an overall length L5 of approximately 3.73 inches and an overall width W3 of 5.83 inches. Furthermore, after breaking cover 515 through line of weakness 533, the remaining portion of flat plate 517 has an overall length L6 of approximately 3.00 inches.

Figure 38:
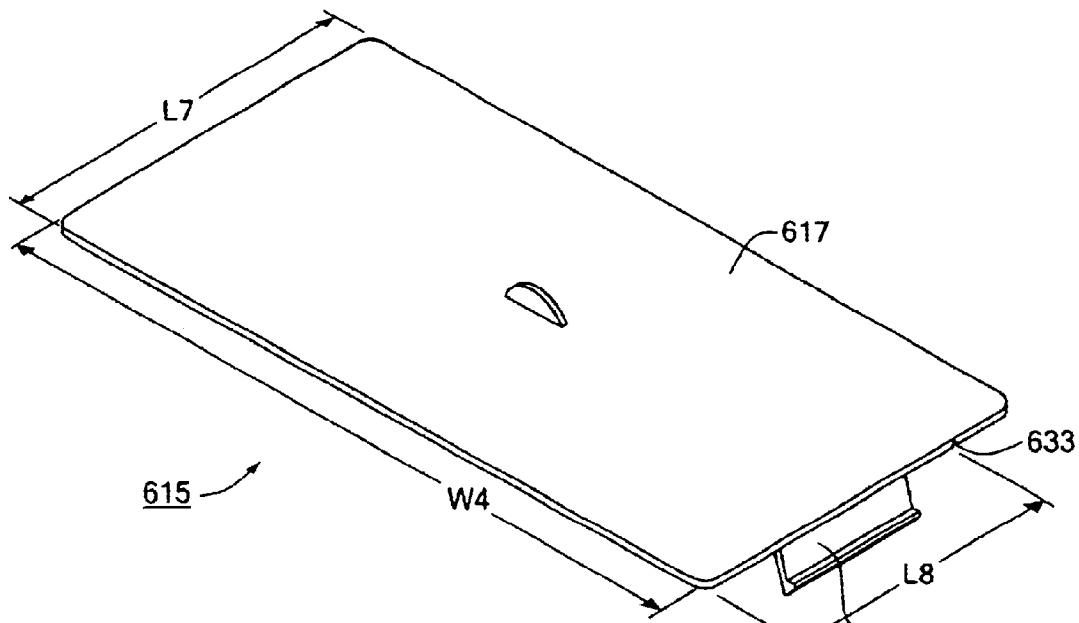
FIG. 38 is a front perspective view of a ninth embodiment of a cover for an electrical box constructed according to the teachings of the present invention.
Figure 39:
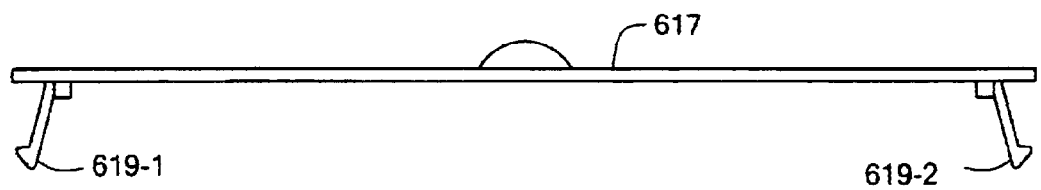
FIG. 39 is a bottom plan view of the cover shown in FIG. 38.

As another example, referring now to FIGS. 38 and 39, there is disclosed a ninth embodiment of a cover which is adapted to be removably mounted onto an electrical box, said cover being constructed according to the teachings of the present invention and identified generally by reference numeral 615.

Cover 615 is similar to cover 215 in that cover 615 comprises a substantially flat plate 617, a handle 618 and a pair of retention wings 619-1 and 619-2 which are integrally formed onto flat plate 617 so as to render cover 615 a unitary device, flat plate 617 being shaped to include a line of weakness 633 which enables cover 615 to be reduced in size.

The primary distinction between cover 615 and cover 215 is that the size and shape of flat plate 617 differs from the size and shape of flat plate 217. Specifically, flat plate 617 is designed primarily for use in conjunction with a four gang electrical box (i.e., an electrical box designed to be used as a mounting structure for four electrical devices), whereas flat plate 217 is designed primarily for use in conjunction with a single gang electrical box (i.e., an electrical box designed to be used as a mounting structure for a single electrical device). Flat plate 617 has an overall length L7 of approximately 3.73 inches and an overall width W4 of 7.61 inches. Furthermore, after breaking cover 615 through line of weakness 633, the remaining portion of flat plate 617 has an overall length L8 of approximately 3.00 inches.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A cover for an electrical box, said electrical box including an interior cavity and an open front end in communication with the interior cavity, said cover having a longitudinal axis and comprising:
   a. a plate sized and shaped to enclose the open front end of said electrical box, said plate including a front surface a rear surface, a top edge, a bottom edge, a right side edge and a left said edge,
   b. a pair of wings which extend rearwardly from the rear surface of said plate, said pair of wings being adapted to secure said cover onto said electrical box, and
   c. at least one post formed onto the rear surface of said plate, said at least post being sized, shaped and located on said plate so as to limit the displacement of said cover along its longitudinal axis when said cover is mounted onto said electrical box.

2. The cover as claimed in claim 1 wherein, with said cover mounted onto said electrical box, said at least one post is sized and shaped to project into the interior cavity of said electrical box.

3. The cover as claimed in claim 2 wherein, each wing includes leg and a foot, each foot including a tapered guiding surface and a flat straight engagement surface.

4. The cover as claimed in claim 2 wherein said at least one post comprises a first pair of spaced apart posts which are formed onto the rear surface of said plate along the top edge and a second pair of spaced apart posts which are formed onto the rear surface of said plate along the bottom edge.

5. A temporary protective cover for an electrical box, said electrical box including an interior cavity and an open front end in communication with the interior cavity, said cover comprising:
   (a) a plate sized and shaped to enclose the open front end of said electrical box, said plate being generally rectangular in shape and having a right side edge, a left side edge, a top edge, a bottom edge and an overall length from the top edge to the bottom edge of approximately 3.73 inches, said plate being shaped to include a line of weakness which extends laterally across the plate from the right side edge to the left side edge and spaced downward from the top edge a distance of approximately 0.73 inches;
   (b) a pair of wings which extend rearwardly from the rear surface of said plate, said pair of wings being adapted to secure said cover onto said electrical box; and
   (c) wherein the portion of the plate above the line of weakness can be broken off about the line of weakness to provide a plate having an overall length of approximately 3.00 inches.

* * * * *